US007315499B2

(12) United States Patent
Kimura et al.

(10) Patent No.: US 7,315,499 B2
(45) Date of Patent: Jan. 1, 2008

(54) OPTICAL DISK APPARATUS, TILT COMPENSATION METHOD, PROGRAM, AND INFORMATION RECORDING MEDIUM

(75) Inventors: Masafumi Kimura, Kanagawa (JP); Susumu Katagiri, Kanagawa (JP); Toshihiro Yamashiro, Kanagawa (JP)

(73) Assignee: Ricoh Company, Ltd. (JP)

( * ) Notice: Subject to any disclaimer, the term of this patent is extended or adjusted under 35 U.S.C. 154(b) by 423 days.

(21) Appl. No.: 10/442,998

(22) Filed: May 22, 2003

(65) Prior Publication Data

US 2003/0223337 A1 Dec. 4, 2003

(30) Foreign Application Priority Data

May 28, 2002 (JP) .............................. 2002-153401
Aug. 30, 2002 (JP) .............................. 2002-255149

(51) Int. Cl.
*G11B 7/00* (2006.01)
(52) U.S. Cl. .................................. 369/53.19; 369/44.32
(58) Field of Classification Search ............. 369/53.19, 369/44.32
See application file for complete search history.

(56) References Cited

U.S. PATENT DOCUMENTS

| 6,041,030 | A * | 3/2000 | Ohmi ....................... 369/53.19 |
| 6,137,754 | A * | 10/2000 | Furukawa et al. ......... 369/44.32 |
| 6,160,772 | A * | 12/2000 | Muramatsu ............... 369/44.32 |
| 6,459,664 | B1 * | 10/2002 | Yamada et al. ........... 369/44.32 |
| 6,526,007 | B1 * | 2/2003 | Fujita ....................... 369/44.32 |
| 6,590,844 | B2 * | 7/2003 | Fujita et al. .............. 369/53.19 |
| 6,639,891 | B1 * | 10/2003 | Katagiri ...................... 369/255 |
| 6,963,520 | B1 * | 11/2005 | Park et al. ................ 369/44.11 |
| 2002/0021640 | A1 * | 2/2002 | Fujita et al. .............. 369/53.19 |
| 2003/0026193 | A1 * | 2/2003 | Shiomi et al. .............. 369/270 |
| 2003/0147314 | A1 * | 8/2003 | Kondo et al. ............. 369/44.32 |
| 2005/0195707 | A1 * | 9/2005 | Park et al. ................ 369/44.26 |

FOREIGN PATENT DOCUMENTS

| JP | 11-39683 | 2/1999 |
| JP | 2000-339727 | 12/2000 |
| JP | 2001-176103 | 6/2001 |

* cited by examiner

*Primary Examiner*—Wayne Young
*Assistant Examiner*—Van T. Pham
(74) *Attorney, Agent, or Firm*—Dickstein Shapiro LLP

(57) ABSTRACT

An optical disk apparatus includes a tilt detection unit detecting the tilt value of an optical disk medium with respect to an optical system. A tilt compensation unit compensates for the tilt of the optical disk medium by adjusting a relative angle between the optical system and the optical disk medium according to the tilt value detected by the tilt detection unit. A tilt detection error estimation unit estimates tilt detection error of the tilt detection unit with respect to a radial position of the optical disk medium at which information is recorded/reproduced by the optical systems by referring to tilt values that are previously detected at a plurality of radial positions of the optical disk medium by the tilt detection unit. The tilt compensation unit has a correction unit that corrects the tilt value according to the tilt detection error estimated by the tilt detection error estimation unit. The tilt compensation unit compensates for the tilt of the optical disk medium according to the tilt value corrected by the correction unit.

22 Claims, 17 Drawing Sheets

OPTICAL DISK APPARATUS, TILT COMPENSATION METHOD, PROGRAM, AND INFORMATION RECORDING MEDIUM

BACKGROUND OF THE INVENTION

1. Field of the Invention

This invention relates to an optical disk apparatus which optically records and/or reproduces information on an optical disk medium, more specifically, a technique to compensate the tilt of an optical disk medium for an optical disk apparatus.

2. Description of the Related Art

In terms of optical disk apparatuses which record and/or reproduce information by irradiating a laser beam to an optical disk medium, due to the increase in recording density, many of such apparatuses are increasingly provided with a function for compensating for the slant angle of an optical disk medium with respect to a recording/reproduction optical system, that is, the deviation between the direction in which a laser beam is irradiated from the recording/reproducing optical system to the optical disk medium and the direction of a normal line relative to an optical disk medium (hereinafter referred as "tilt").

Such an apparatus performing tilt compensation, generally, has a tilt sensor arranged at an optical pickup of a recording/reproducing optical system for performing tilt detection, and has a tilt mechanism for adjusting the angle of the optical pickup relative to an optical disk medium. Thus structured, at a tilt servo circuit of the optical disk apparatus, the tilt mechanism is actuated in response to a detection signal from the tilt sensor, to thereby compensate for tilt. Nevertheless, such structure has limitations in providing precise tilt compensation. This limitation shall be described with reference to FIGS. 12 and 13.

In FIG. 12, the horizontal axis indicates the distance from the center of an optical disk medium to the radial position at which a laser light beam is irradiated for recording or reproduction (objective lens radius), and the vertical axis indicates tilt. Curve 51 indicates a typical tilt characteristic of an optical disk (form of medium). Since the tilt is mostly caused by the bending of the medium, the tilt tends to increase more toward the outer periphery of the medium. Curve 52 indicates the tilt value detected by the tilt sensor. Not only does the difference between the curve 51 and the curve 52 indicate tilt detection error, such difference also indicates tilt compensation error in which tilt is compensated for in correspondence to the tilt value detected by the tilt sensor. In plotting out the tilt compensation error, the tilt compensation error is illustrated as curve 55 in FIG. 13. Due to the tilt compensation error, recording and reproduction tends to become more unstable, especially toward the outer periphery of the medium.

The main cause for the creation of tilt detection error shown in FIG. 12 is the fact that the distance from the center of the optical disk medium to the center of the tilt sensor (tilt sensor radius) is, in general, different compared to the distance from the center of the optical disk medium to the center of the objective lens (objective lens radius).

A conventional art method for reducing tilt compensation error due to tilt detection error is shown in Japanese patent laid-open application No. 2001-176103. In one example of the conventional art, tilt values are detected, upon insertion of an optical disk medium, from numerous radial areas from the inner periphery to the outer periphery of the medium, and are stored inside a memory in a manner corresponding to tilt sensor radius. Upon performing recording/reproduction, the tilt value corresponding to an objective lens radius of a seek position is read out from the memory, and is used in tilt compensation. In another example of the conventional art, tilt values are detected, upon insertion of an optical disk medium, from numerous radial areas from the inner periphery to the outer periphery of the medium, and are stored inside a memory in a manner corresponding to objective lens radius. Upon performing recording/reproduction, an objective lens radius of a seek position is converted to tilt sensor radius, and then, the tilt value corresponding to the tilt sensor radius is read out from the memory, and is used in tilt compensation.

Although tilt compensation error due to the difference between the objective lens radius and the tilt sensor radius may be reduced with the conventional art, the conventional art has a problem of increasing the waiting time before beginning a recording/reproduction operation since the conventional art requires performing tilt detection at many radial areas before being able to begin the recording/reproducing operation.

SUMMARY OF THE INVENTION

It is a general object of the present invention to provide an optical disk apparatus, tilt compensation method, program, and information recording medium that substantially obviates one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by an optical disk apparatus, tilt compensation method, program, and information recording medium particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides an optical disk apparatus including a tilt detection unit detecting the tilt value of an optical disk medium with respect to an optical system, a tilt compensation unit compensating for the tilt of the optical disk medium by adjusting a relative angle between the optical system and the optical disk medium according to the tilt value detected by the tilt detection unit, and a tilt detection error estimation unit estimating tilt detection error of the tilt detection unit with respect to a radial position of the optical disk medium at which information is recorded/reproduced by the optical system by referring to tilt values which are previously detected at a plurality of radial positions of the optical disk medium by the tilt detection unit, wherein the tilt compensation unit has a correction unit which corrects the tilt value according to the tilt detection error estimated by the tilt detection error estimation unit, wherein the tilt compensation unit compensates for the tilt of the optical disk medium according to the tilt value corrected by the correction unit.

Further, an optical disk apparatus according to the present invention includes a tilt detection unit detecting the tilt value of an optical disk medium with respect to an optical system, a tilt compensation unit compensating for the tilt of the optical disk medium by rendering a tilt mechanism to adjust a relative angle between the optical system and the optical disk medium according to the tilt value detected by the tilt detection unit, and a tilt detection error estimation unit estimating tilt detection error of the tilt detection unit with respect to a radial position of the optical disk medium at which information is recorded/reproduced by the optical system by referring to the driving amounts of the tilt mechanism which are previously detected at plural radial positions of the optical disk medium, wherein the tilt compensation unit has a correction unit which corrects the tilt value according to the tilt detection error estimated by the tilt detection error estimation unit, wherein the tilt compensation unit compensates for the tilt of the optical disk medium according to the tilt value corrected by the correction unit.

In the optical disk apparatus according to the present invention, the estimation of tilt detection error and the correction of tilt value are performed upon the optical disk only with respect to a portion thereof which is disposed at a radial position outward from (greater than) a prescribed radial position of the optical disk.

Further, a method of compensating for the tilt of an optical disk according to the present invention includes the steps of: a) detecting tilt values from a plurality of radial positions of the optical disk medium in a state where tilt compensation is ceased; b) estimating tilt detection error at a radial position of the optical disk medium according to the tilt values obtained in step a), and forming a table indicative of radial positions corresponding to tilt detection errors; c) obtaining the tilt detection error at a radial position of the optical disk medium at which information is recorded/reproduced by the optical system by using the table; and d) conducting tilt compensation according to a tilt value corrected to the extent of the tilt detection error obtained in step c).

Further, a method of compensating for the tilt of an optical disk according to the present invention includes the steps of: a) detecting tilt values from a plurality of radial positions of the optical disk medium in a state where tilt compensation is ceased; b) determining an approximate formula based on radial positions of the optical disk medium according to the tilt values detected in step a); c) calculating the tilt value of a radial position at which information is recorded/reproduced by the optical system and the tilt value at which the present tilt is detected by using the approximate formula, and obtaining the difference between the two tilt values; and d) conducting tilt compensation according to a tilt value corrected to the extent of the tilt detection error obtained in step c).

The method of compensating for the tilt of an optical disk according to the present invention, further includes a step of: compensating for tilt at a predetermined radial position at which a distance from the center of the optical disk medium to a position at which information is recorded/reproduced by the optical system is equal to a distance from the center of the optical disk medium to a position where tilt is detected, wherein the tilt compensation is conducted prior to step a).

Further, a method of compensating for the tilt of an optical disk includes the steps of: a) detecting the driving amount of a tilt mechanism from a plurality of radial positions of the optical disk medium in a state where tilt compensation is performed; b) estimating tilt detection error at a radial position of the optical disk medium according to the driving amount obtained in step a), and forming a table indicative of radial positions corresponding to tilt detection errors; c) obtaining the tilt detection error at a radial position of the optical disk medium at which information is recorded/reproduced by an optical system by using the table; and d) conducting tilt compensation according to a tilt value corrected to the extent of the tilt detection error obtained in step c).

Further, a method of compensating for the tilt of an optical disk according to the present invention includes the steps of: a) detecting the driving amount of tilt mechanism from a plurality of radial positions of the optical disk medium in a state where tilt compensation is performed; b) determining an approximate formula based on radial positions of the optical disk medium according to the driving amount obtained in step a); c) calculating the tilt value of a radial position at which information is recorded/reproduced by the optical system and the tilt value at which the present tilt is detected by using the approximate formula, and obtaining the difference between the two tilt values; and d) conducting tilt compensation according to a tilt value corrected to the extent of the tilt detection error obtained in step c).

Further, a program using a processor for compensating for the tilt of an optical disk according to the present invention includes the steps of: a) detecting tilt values from a plurality of radial positions of the optical disk medium in a state where tilt compensation is ceased; b) estimating tilt detection error at a radial position of the optical disk medium according to the tilt values obtained in step a), and forming a table indicative of radial positions corresponding to tilt detection errors; c) obtaining the tilt detection error at a radial position of the optical disk medium at which information is recorded/reproduced by the optical system by using the table; and d) conducting tilt compensation according to a tilt value corrected to the extent of the tilt detection error obtained in step c).

Further, a program using a processor for compensating for the tilt of an optical disk, includes the steps of: a) detecting tilt values from a plurality of radial positions of the optical disk medium in a state where tilt compensation is ceased; b) determining an approximate formula based on radial positions of the optical disk medium according to the tilt values detected in step a); c) calculating the tilt value of a radial position at which information is recorded/reproduced by the optical system and the tilt value at which the present tilt is detected by using the approximate formula, and obtaining the difference between the two tilt values; and d) conducting tilt compensation according to a tilt value corrected to the extent of the tilt detection error obtained in step c).

The program using a processor for compensating for the tilt of an optical disk according to the present invention further includes a step of compensating for tilt at a predetermined radial position at which a distance from the center of the optical disk medium to a position at which information is recorded/reproduced by the optical system is equal to a distance from the center of the optical disk medium to a position where tilt is detected, wherein the tilt compensation is conducted prior to step a).

Further, a program using a processor for compensating for the tilt of an optical disk according to the present invention includes the steps of: a) detecting the driving amount of a tilt mechanism from a plurality of radial positions of the optical disk medium in a state where tilt compensation is performed; b) estimating tilt detection error at a radial position of the optical disk medium according to the driving amount obtained in step a), and forming a table indicative of radial positions corresponding to tilt detection errors; c) obtaining the tilt detection error at the radial position of the optical disk medium at which information is recorded/reproduced by an optical system by using the table; and d) conducting tilt compensation according to a tilt value corrected to the extent of the tilt detection error obtained in step c).

Further, a program using a processor for compensating the tilt of an optical disk according to the present invention, includes the steps of: a) detecting the driving amount of tilt from a plurality of radial positions of the optical disk medium in a state where tilt compensation is performed; b) determining an approximate formula based on radial positions of the optical disk medium according to the driving amount obtained in step a); c) calculating the tilt value of a radial position at which information is recorded/reproduced by the optical system and the tilt value at which the present tilt is detected by using the approximate formula, and obtaining the difference between the two tilt values; and d) conducting tilt compensation according to a tilt value corrected to the extent of the tilt detection error obtained in step c).

Further, an information recording medium has a program recorded thereto for enabling a processor to perform a method of compensating for the tilt of an optical disk according to the present invention, in which the method includes the steps of: a) detecting tilt values from a plurality of radial positions of the optical disk medium in a state where tilt compensation is ceased; b) estimating tilt detection error at a radial position of the optical disk medium according to the tilt values obtained in step a), and forming a table indicative of radial positions corresponding to tilt detection errors; c) obtaining the tilt detection error at a radial position of the optical disk medium at which information is recorded/reproduced by the optical system by using the table; and d) conducting tilt compensation according to a tilt value corrected to the extent of the tilt detection error obtained in step c).

Further, an information recording medium has a program recorded thereto for enabling a processor to perform a method of compensating for the tilt of an optical disk according to the present invention, in which the method includes the steps of: a) detecting tilt values from a plurality of radial positions of the optical disk medium in a state where tilt compensation is ceased; b) determining an approximate formula based on radial positions of the optical disk medium according to the tilt values detected in step a); c) calculating the tilt value of a radial position at which information is recorded/reproduced by the optical system and the tilt value at which the present tilt is detected by using the approximate formula, and obtaining the difference between the two tilt values; and d) conducting tilt compensation according to a tilt value corrected to the extent of the tilt detection error obtained in step c).

Further, the information recording medium has a program recorded thereto for enabling a processor to perform a method of compensating for the tilt of an optical disk according to the present invention, in which the method further includes a step of compensating for tilt at a predetermined radial position at which a distance from the center of the optical disk medium to a position at which information is recorded/reproduced by the optical system is equal to a distance from the center of the optical disk medium to a position where tilt is detected, wherein the tilt compensation is conducted prior to step a).

Further, an information recording medium has a program recorded thereto for enabling a processor to perform a method of compensating for the tilt of an optical disk according to the present invention, in which the method includes the steps of: a) detecting the driving amount of a tilt mechanism from a plurality of radial positions of the optical disk medium in a state where tilt compensation is performed; b) estimating tilt detection error at a radial position of the optical disk medium according to the driving amount obtained in step a), and forming a table indicative of radial positions corresponding to tilt detection errors; c) obtaining the tilt detection error at a radial position of the optical disk medium at which information is recorded/reproduced by an optical system by using the table; and d) conducting tilt compensation according to a tilt value corrected to the extent of the tilt detection error obtained in step c).

Further, an information recording medium has a program recorded thereto for enabling a processor to perform a method of compensating for the tilt of an optical disk according to the present invention, in which the method includes the steps of: a) detecting the driving amount of tilt from a plurality of radial positions of the optical disk medium in a state where tilt compensation is performed; b) determining an approximate formula based on radial positions of the optical disk medium according to the driving amount obtained in step a); c) calculating the tilt value of a radial position at which information is recorded/reproduced by the optical system and the tilt value at which the present tilt is detected by using the approximate formula, and obtaining the difference between the two tilt values; and d) conducting tilt compensation according to a tilt value corrected to the extent of the tilt detection error obtained in step c).

Other objects and further features of the present invention will be apparent from the following detailed description when read in conjunction with the accompanying drawings.

DESCRIPTION OF THE PREFERRED EMBODIMENTS

In the following, embodiments of the present invention will be described with reference to the accompanying drawings.

Figure 1:
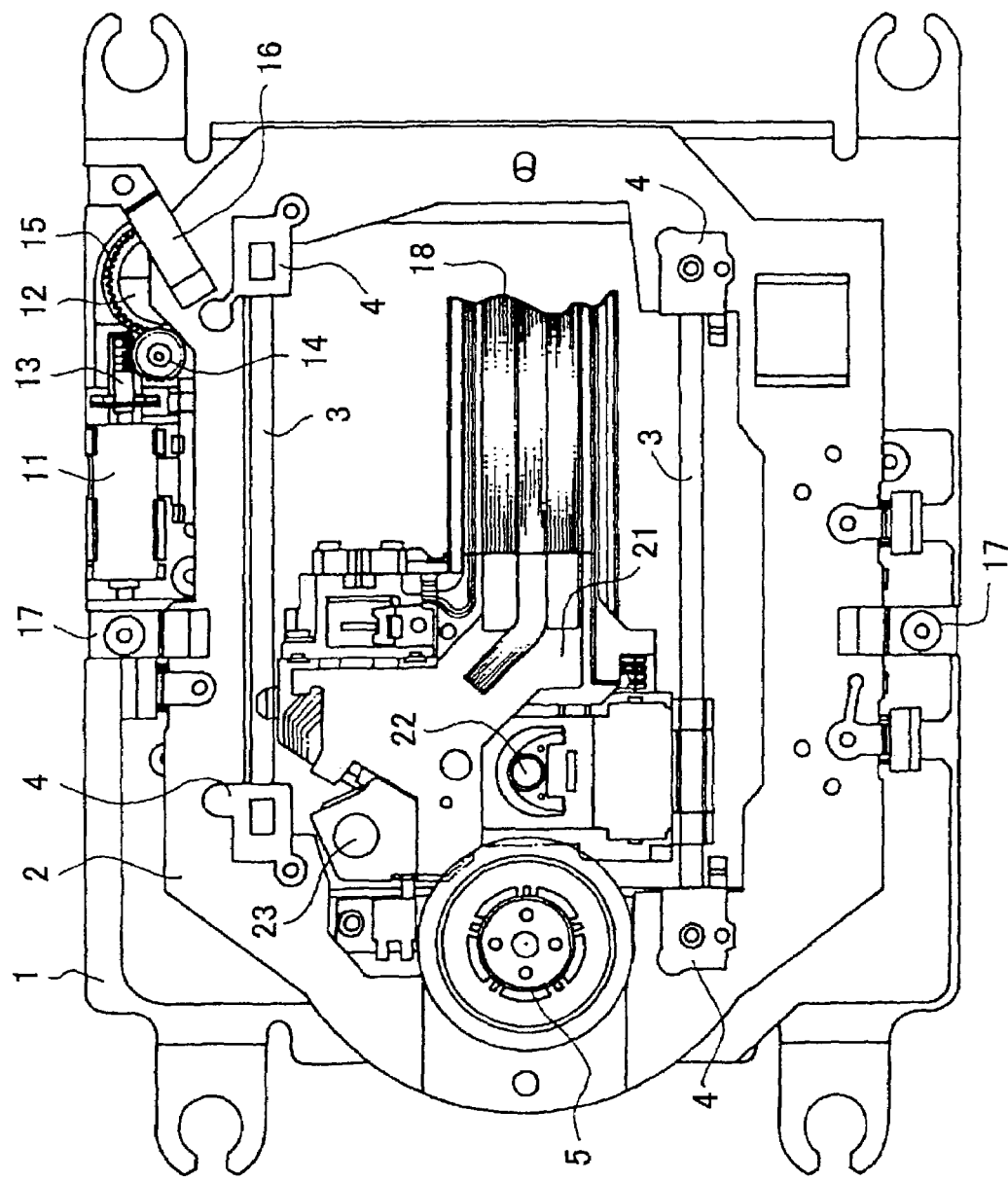
FIG. 1 is a partial schematic plan view showing an example of an optical pickup of an optical disk apparatus of the present invention.

FIG. 1 is a partial schematic plan view showing an example of an optical pickup of an optical disk apparatus according to the present invention.

In FIG. 1, numeral 1 indicates a main chassis, and numeral 2 indicates a sub-chassis. The main chassis 1 supports the sub-chassis 2 with a pair of supporting portions 17, in which the sub-chassis 2 having the supporting portions serve as fulcrums may be tilted to an angle within a prescribed range and thus in a perpendicular direction with respect to the main chassis 1. The sub-chassis 2 has a pair of seek rails 3 which are fixed by seek rail receivers 4. The seek rails 3 support a pickup module 21, which serves as a main portion of the optical pickup, and allow the pickup module 21 to move slidably. Mounted on the pickup module 21 is a recording/reproduction optical system (described below) including an objective lens 22, and a tilt sensor 23 in which the members are electrically connected to a circuit board (not shown) arranged on a back side of the main chassis 1 with an FPC cable 18. A seek driving mechanism (although not illustrated) including a seek motor for moving the pickup module 21 is arranged on the back side of the sub-chassis 2. Numeral 5 indicates a spindle motor that rotates an optical disk medium at high speed.

The optical pickup has a tilt mechanism for adjusting the tilt of the sub-chassis 2 with respect to the main chassis 1. In the tilt mechanism of this example, a restraining spring 16 presses an end portion of the sub-chassis 2 against a cam 12 that changes height in a peripheral direction. The cam 12 is rotated in accordance with the rotation of a rotational axis 13 of a tilt motor 11 by having the rotation transmitted via a gear 15 provided to the cam 12. Thereby, the angle in the tilt of the sub-chassis 2 can be changed.

Figure 2:
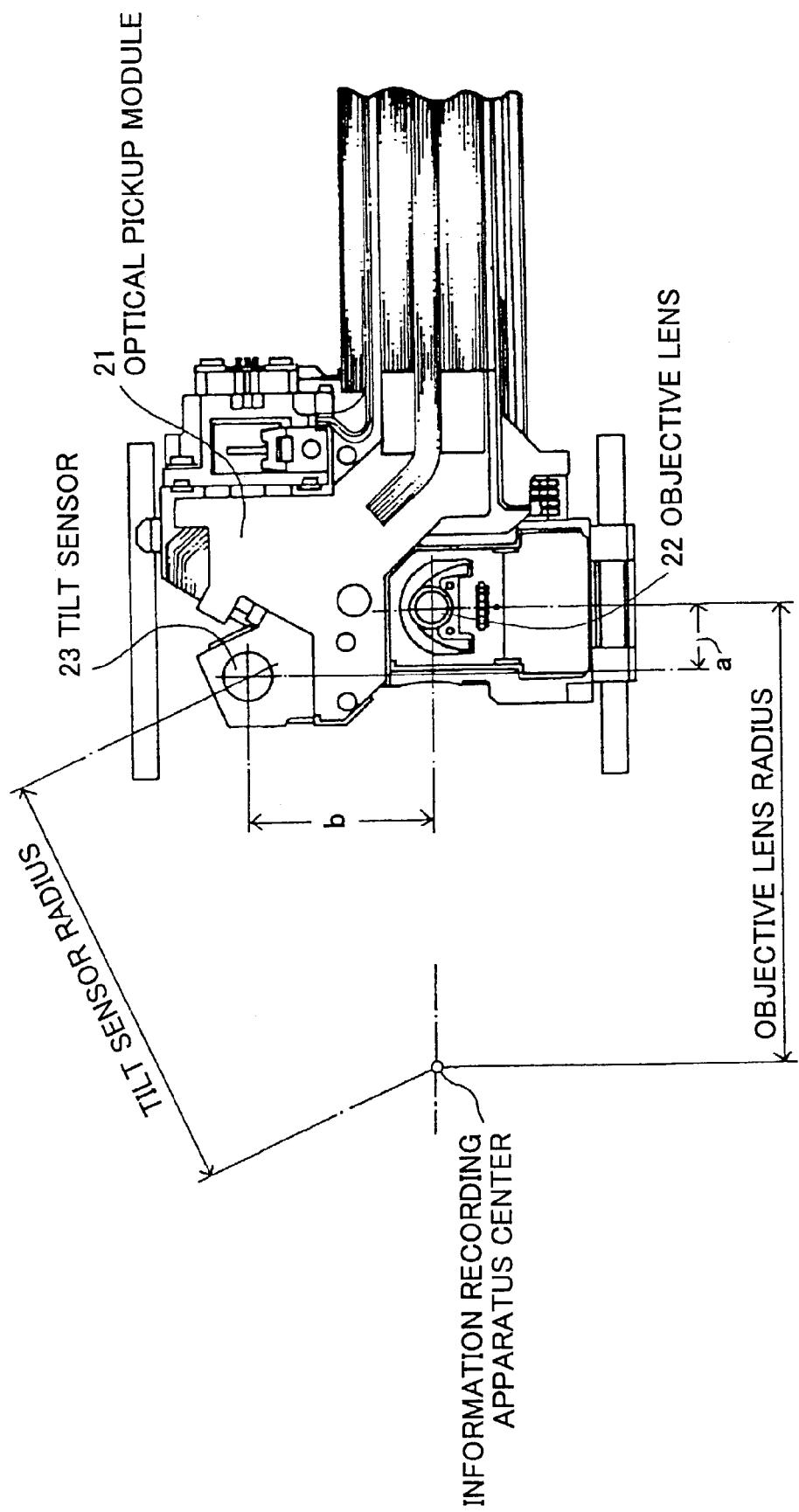
FIG. 2 is an explanatory view showing an objective lens radius and a tilt sensor radius.

The positional relation between the objective lens 22 and the tilt sensor 23 shall be described with reference to FIG. 2. FIG. 2 shows the pickup module 21 seen from the optical disk medium. In general, the distance from the center of the optical disk medium to the center of the tilt sensor 23 (tilt sensor radius) and the distance from the center of the optical disk medium to the center of the objective lens 22 (objective lens radius) are not equal. In a case where the objective lens radius seeks to a radial position r, the tilt sensor radius is $\sqrt{\{(r-a)^2+b^2\}}$. The tilt sensor radius and the objective lens radius shall only be equal when the radial position is $r=(a^2+b^2)/2a$. In other words, the tilt value detected by the tilt sensor 23 is, in general, a tilt value detected at a radial position deviates from a radial position where the recording/reproduction optical system records/reproduces information. This causes the aforementioned tilt detection error, and therefore, also causes tilt compensation error. Furthermore, the tilt detection error increases at the outer peripheral portion of an optical disk medium where there is generally a large amount of tilt, and correspondingly the tilt compensation error at such a portion will also increase. As a result, a significant lack of recording/reproduction performance is caused at such a portion.

Figure 3:
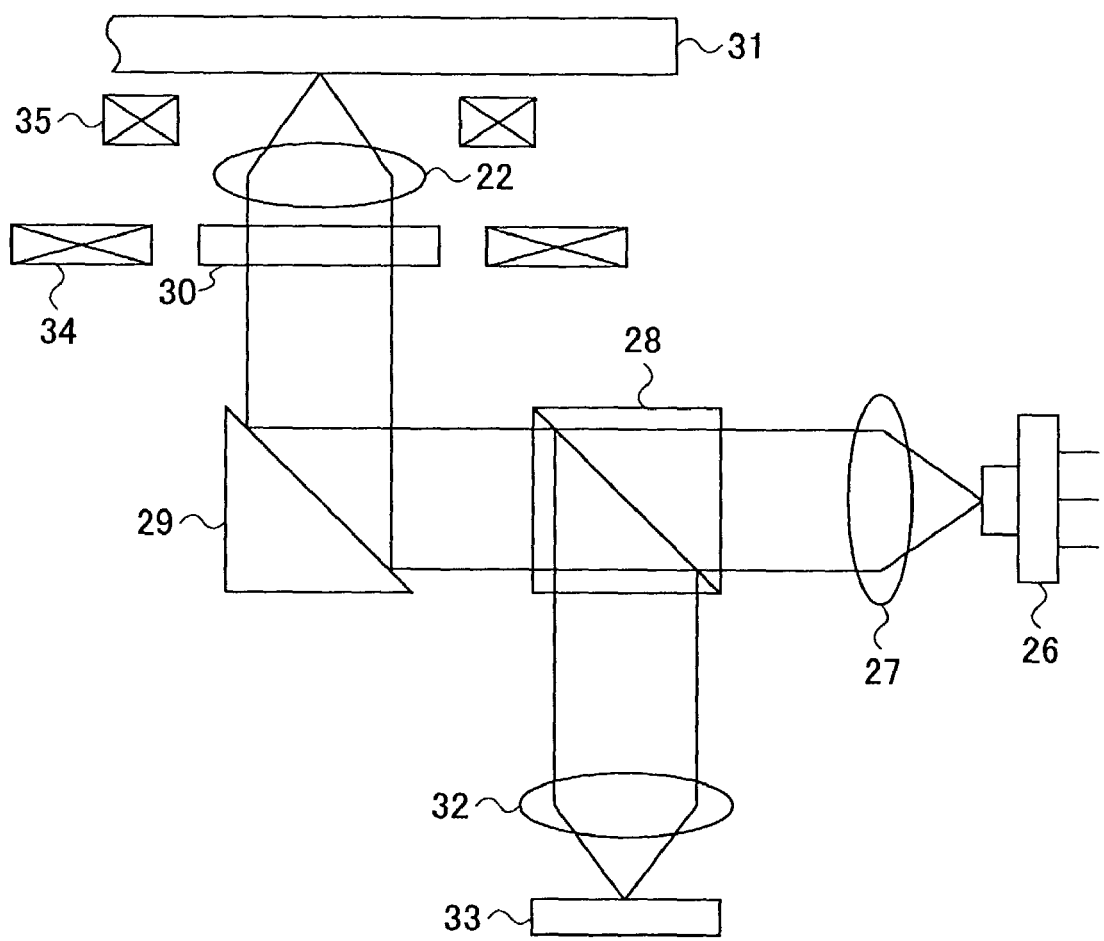
FIG. 3 is a schematic view for explaining an example of a recording/reproduction optical system.

An example of the recording/reproduction optical system is shown in FIG. 3. A laser light (linearly polarized light) irradiated from a semiconductor laser 26 as a divergent light is formed into a parallel light by a collimator lens 27, and is incident on a beam splitter 28. The beam splitter 28 transmits or reflects light at an adhesive layer in accordance with the polarization direction. The incident light, which is a parallel light, is transmitted through the beam splitter 28 since the incident light vibrates parallel with respect to the incident plane of the beam splitter 28. The transmitted laser light beam changes direction at the standup mirror 29, and is incident on the ¼ waveplate 30, to thereby change from a linearly polarized light to a circularly polarized light. Subsequently, the objective lens 22 condenses the laser light beam on the recording surface of the optical disk medium. In recording of information, the semiconductor laser 26 is modulated according to the information subject to be recorded, in which the modulated laser light beam enables information to be recorded on the recording surface of the optical disk medium 31.

Although the light reflected from the recording surface is incident on the ¼ waveplate via the objective lens 22, and is changed once again from a circularly polarized light to a linearly polarized light, the light being foremost incident on the ¼ waveplate 30 shall have a phase deviating 90 degrees, to thereby become a light of perpendicular vibration. The beam splitter 28 reflects such light in a direction perpendicular to the incident direction. A condensing lens 32 then condenses the light to a light receiving element 33. The amount of light received at the light receiving element 33 is converted to an electrical signal, to thereby allow the information recorded on the optical disk medium 31 to be reproduced from the electric signal. The light receiving element is, generally, divided into plural light receiving elements, and tracking error signals and focus error signals are created by adding/subtracting the output signals of each of the divided light receiving elements. Numeral 34 indicates a tracking coil for slightly moving the objective lens 22 in a radial direction of the optical disk medium, and numeral 35 indicates a focusing coil for slightly moving the objective lens 22 in a light axis direction. Tracking servo and focusing servo are performed by applying electric current to the tracking coil 34 and the focusing coil 35 in the amounts corresponding to the tracking error signal and the focus error signal, respectively.

Figure 4A:
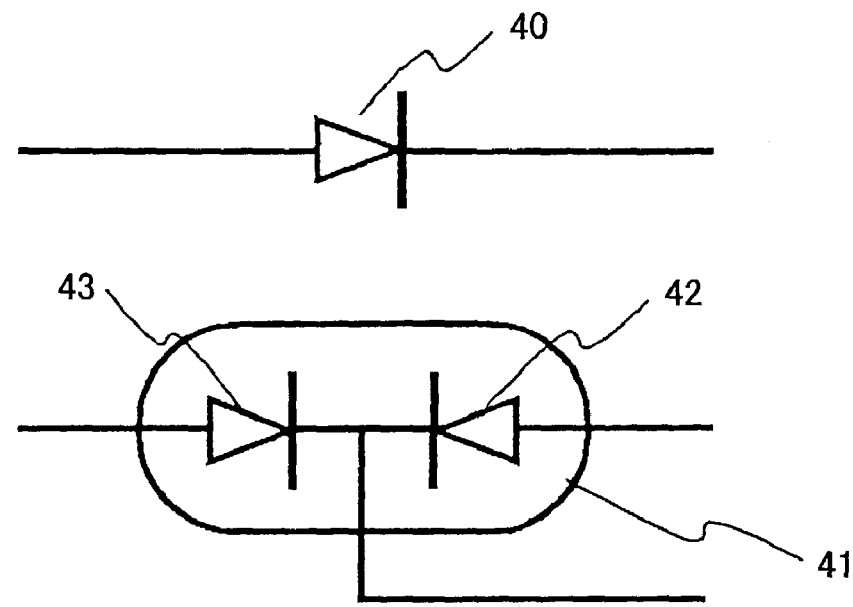
FIGS. 4a and 4b are schematic views for explaining an example of a tilt sensor.
Figure 4B:
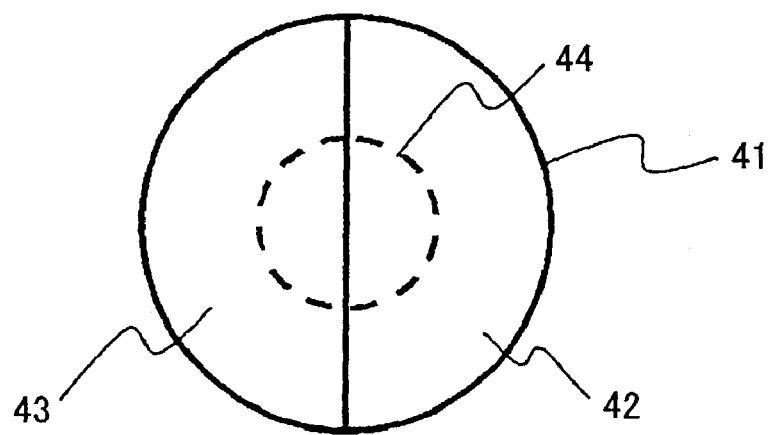
Figure 5:
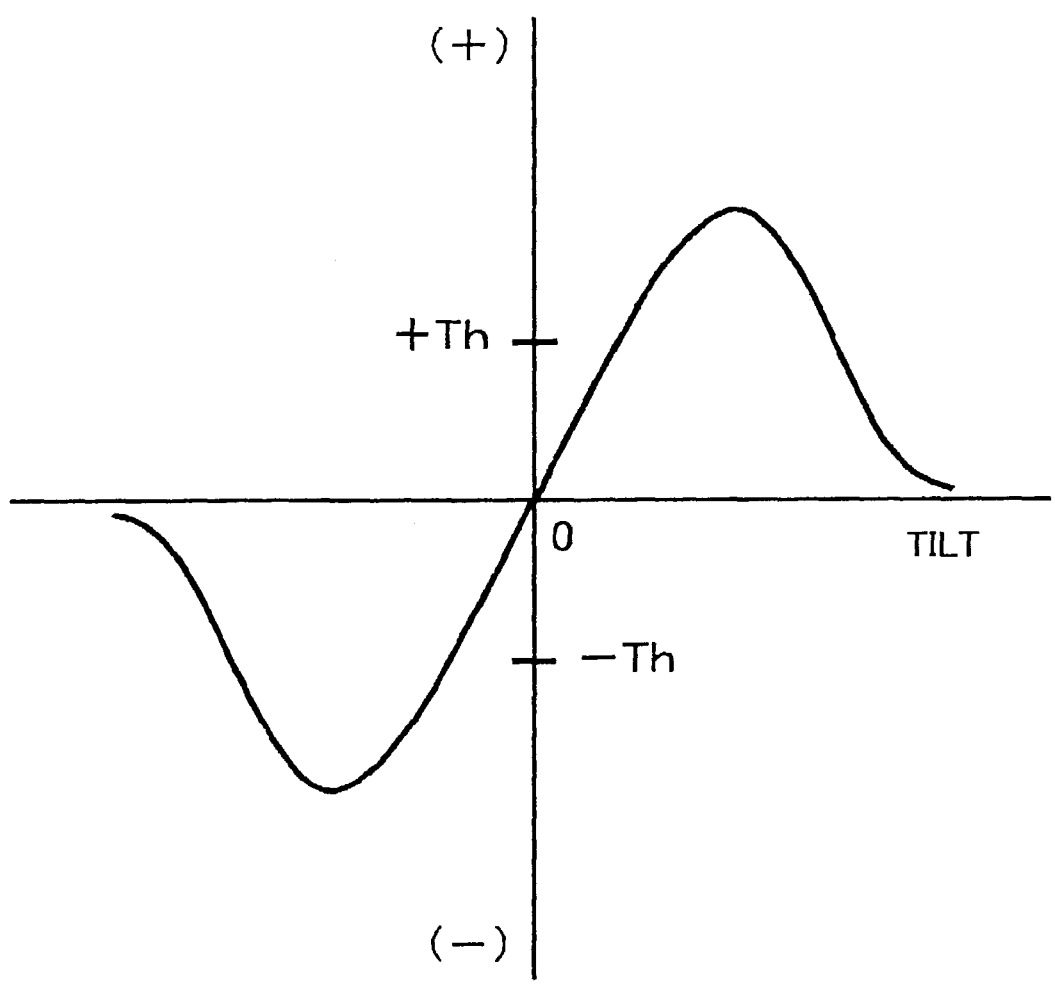
FIG. 5 is a diagram showing a relation between a difference signal of a tilt sensor and tilt.

In an example of the tilt sensor 23 shown in FIG. 4(a), a light emitting diode 40 emits light for irradiating a light beam upon an optical disk medium, and a reflected light thereof is received by a two-divided light receiving element 41 formed of two photo diodes 42, 43. In a case where the two-divided light receiving element 41 is parallel to the optical disk medium (tilt=0), the center of a refection light spot 44 is positioned on a separating line between the photodiode 42 and photodiode 43. As the tilt increases, the reflection light spot 44 will correspondingly move to a position toward either one of the photodiodes. Since the relation of the difference signal for the electric current flowing through the photodiodes 42, 43 (tilt signal) and the tilt value may be illustrated in the manner shown in FIG. 5, the amount and direction of the tilt can be obtained from the value of the difference signal.

Figure 6:
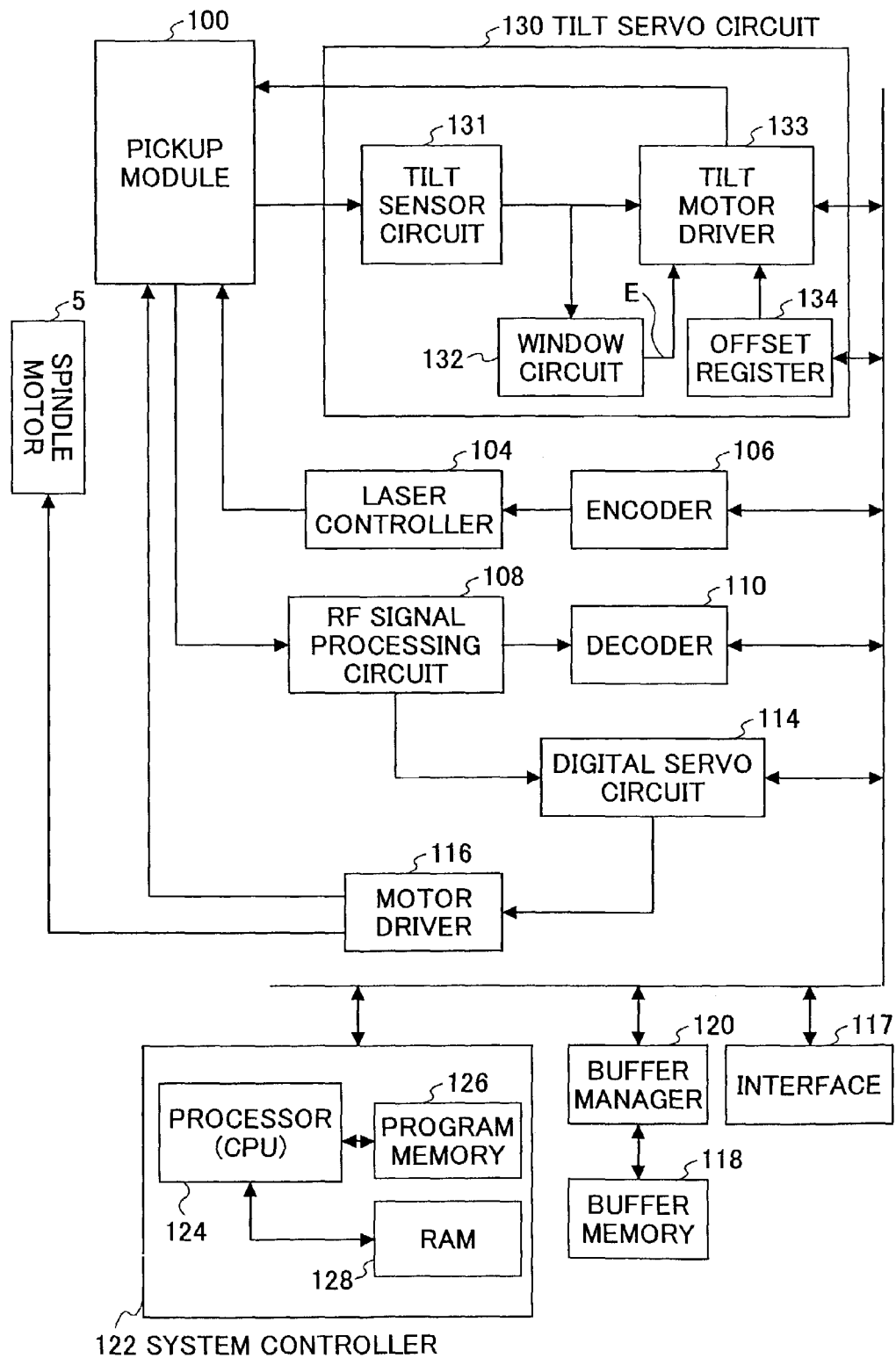
FIG. 6 is a block diagram showing an example of a process/control system of an optical disk apparatus of the present invention.

FIG. 6 is a schematic block diagram showing an example of a structure of a control processing system of the optical disk apparatus. The control processing system is mounted on the circuit board arranged at the back side of the main chassis 1.

As for elements directly related to the recording/reproduction of information, the optical disk apparatus includes the optical pickup 100, a laser controller 104, an encoder 106, an RF signal processing circuit 108, a decoder 110, a digital servo circuit 114, a motor driver 116, a buffer memory 118, and a buffer manager 120. The optical disk apparatus also includes a tilt servo circuit 130 for compensating for tilt, a system controller 122 for controlling the above-given components and entire operation of the optical disk apparatus, and an interface 117 for interchanging information and command with an upper level apparatus such as a personal computer.

The system controller 122 has a structure of a program control type including a processor (CPU) 124, a program memory 126 for storing a program which is executed by the processor 124, and a RAM 128 for temporarily storing various data, in which operation of the optical disk apparatus may be changed by re-writing the program inside the program memory 126. It is to be noted that the system controller 122 may be actualized with ASIC (Application Specific Integrated Circuit) and the like.

The encoder 106 encodes information into signals to enable the information to be written on the optical disk medium, and the laser controller 104 modulates the semiconductor laser 26 of the optical pickup 100 in correspondence to the signals for writing. The RF signal processing circuit 108 may, for example, enable amplification or waveform shaping of the output signal from the light receiving element 33 of the optical pickup 100, or generate tracking error signals and focus error signals. The decoder 110 decodes the recording information of the optical disk medium from the signals output from the RF signal processing circuit 108. The buffer memory 118 temporarily stores writing data sent from an upper apparatus or data reproduced from the optical disk medium, and the buffer manager 120 manages the readout and the writing data of the buffer memory 118. The digital servo circuit 114 drives the tracking coil 34 and the focusing coil 35 of the optical pickup 100 via the motor driver 116 in accordance with the tracking error signals and focus error signals, respectively, generated from the RF signal processing circuit 108. The digital servo circuit 114 also controls the drive of the spindle motor 5 and the seek motor of the optical pickup 100.

Since the above description of the structure and operation directly related to recording/reproduction of information shall apply to those of the same kind of conventional optical disk apparatuses, a further detailed description thereof shall be omitted.

Since the feature of the optical disk apparatus of the present invention is related to tilt compensation, a further detailed description on the tilt compensation shall be given below.

The tilt servo circuit 130 includes: a tilt sensor circuit 131 that generates difference signals of the photodiodes 42, 43 of the tilt sensor 23 of the optical pickup 100, and outputs the signals as tilt signals via a low pass filter; a window circuit 132 that generates a tilt error signal E when the value of the tilt signal deviates from a prescribed range (the range from +Th to −Th shown in FIG. 5); and a tilt motor driver 133 that takes in the tilt signal, converts the signal to a digital value (detected tilt value), and drives the tilt motor 11 of the optical pickup 100 according to an added value (corrected tilt value) obtained by adding the detected tilt value to an offset value prescribed in the offset register 134, and thereby compensates for tilt. That is, the tilt servo circuit 130 serves as a tilt mechanism of the optical pickup 100 as well as a tilt compensation unit. Although the tilt sensor circuit 131 shown in this example is included in the tilt servo circuit 130, it is to be noted that the tilt sensor circuit 131, along with the tilt sensor 23 of the optical pickup 100, also serves as an element included in a tilt detection unit.

In order to perform estimation of tilt detection error and the like, the optical disk apparatus of the present invention requires a specific process and control in a mounting period during which an optical disk medium is inserted and an information recording/reproduction period. As for the unit for performing the aforementioned process and control, the CPU 124 in the system controller 122 may actualize such performance by following the program inside the program memory 126. The said program, the program memory 126 having the program recorded thereto, and also other kinds of information recording media which can be read by a processor are included in this invention.

Figure 7:
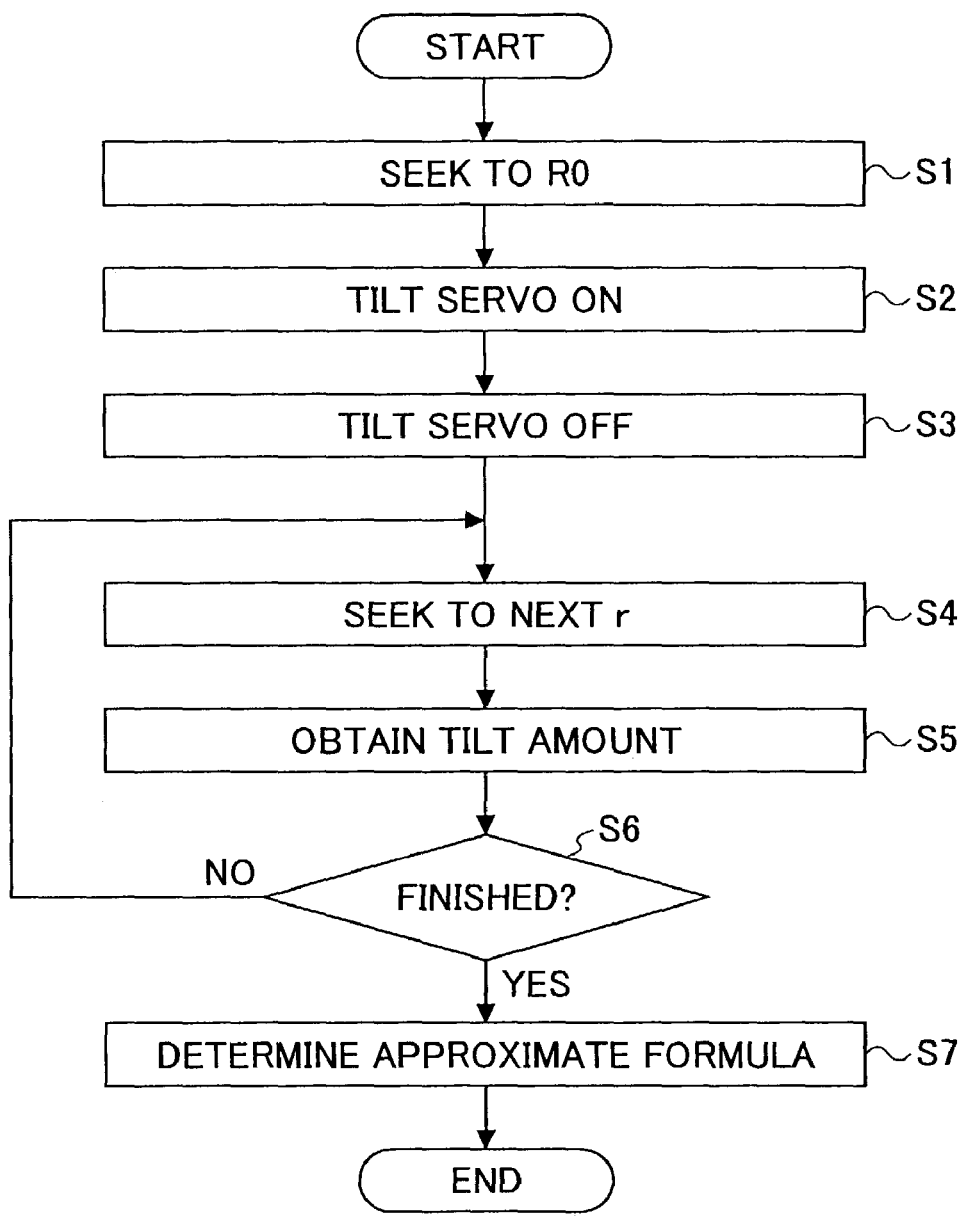
FIG. 7 is a flowchart for explaining controlling/processing performed during a mounting process of the first embodiment of the present invention.
Figure 9:
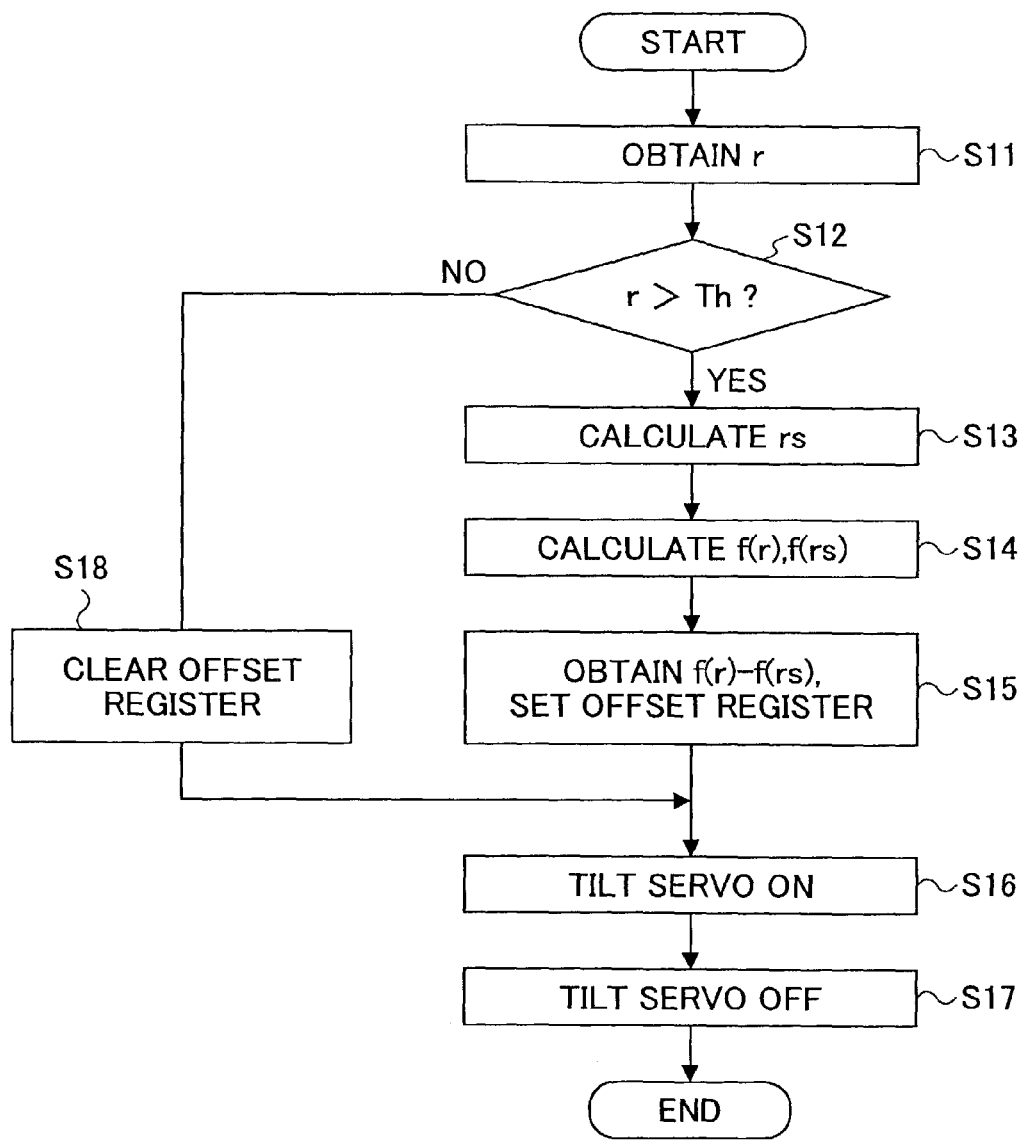
FIG. 9 is a flowchart for explaining controlling/processing performed during an information recording/reproduction period of the first embodiment of the present invention.

According to the first embodiment, the process and control shown in FIG. 7 are performed in a mounting period. The process and control shown in FIG. 9 are performed when a tilt error signal E is generated in an information recording/reproduction period. Nevertheless, such process and control are not necessarily performed only upon mounting. The process and control may also be performed when an optical disk medium inserted into the apparatus is recorded or reproduced for the first time.

FIG. 7 shall first be described. In a mounting period, the system controller 122 orders the digital servo circuit 114 to seek to a position corresponding to radius r0 of the optical disk medium. The digital servo circuit 114 signals the motor driver 116 to drive a seek motor of the optical pickup 100, to thereby move a pickup module 21 (Step S1) to the ordered radius position. In this embodiment, the ordered radius position in this step is a position at which the tilt sensor radius and the objective lens radius are equal.

The system controller 122 orders the tilt motor driver 133 of the tilt servo circuit 130 to perform tilt compensation (Step S2). The tilt motor driver 133 receives a tilt signal output from the tilt sensor circuit 131, converts the tilt signal into a digital value (detected tilt value), and drives the tilt motor 11 according to the added value obtained by adding the digital value to a value of the offset register 134. Since the offset register during this step is cleared and the offset value is 0, tilt compensation during this step is performed, substantively, in accordance with the detected tilt value. At the radius position of r0, no tilt detection error (offset value) shall be caused by the difference between the tilt sensor radius and the objective lens radius, since the radii are equal at said radius position r0, and therefore, tilt may be compensated for with high precision even when the offset value is not yet known.

The system controller 122 ceases tilt compensation of the tilt servo circuit 130 after the time required for tilt compensation has elapsed (Step S3). Subsequently, the system controller 122 orders the digital servo circuit 114 to seek to another prescribed radius position (Step S4). Upon finishing the seek procedure, the system controller 122 signals the tilt motor driver 133 to convert the difference signal into a digital value, take the digital value and store the digital value in the RAM 128, wherein the RAM 128 stores the digital value in correspondence to the radius (Step S5). The digital value is a tilt value having radius position r0 as a criterion. Step S4 and Step S5 are repeated a prescribed number of times.

Figure 8:
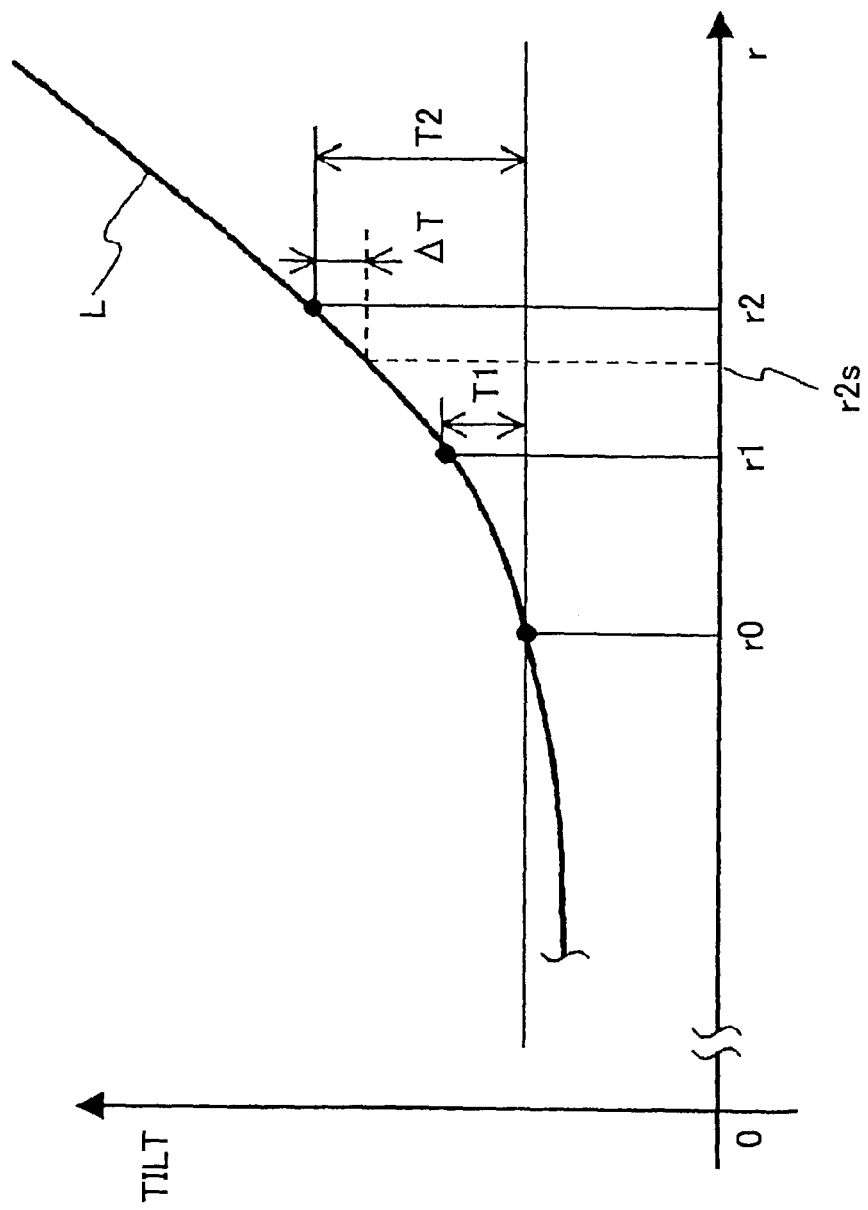
FIG. 8 is a diagram for explaining estimation of tilt detection error.

In this embodiment, the seek procedure is performed at radial positions r1 and r2 shown in FIG. 8, and the tilt values detected thereat are T1 and T2, respectively. The detected tilt values obtained are stored in correspondence to respective radii. The detected tilt values shall be used in a subsequent step S7 for determining an approximate formula for estimating the tilt (corresponding to curve line L in FIG. 8) at a radial position r of the optical disk medium in a case where radial position r0 is the criterion. As in this embodiment, such estimation of tilt may be achieved by obtaining tilt values from just three radial positions including that of radial position r0, since tilt of an optical disk medium, in general, changes gradually with respect to radius (for example, it may approximate a quadratic function). Although a tilt value corresponding to a radial position located more inward than r0 may also be obtained, it is to be noted that this embodiment obtains a tilt value corresponding to a radial position located more outward than r0 since it is necessary to enhance precision for estimating tilt at the outer peripheral portions of the optical disk medium at which there is, in general, a considerable amount of tilt.

After obtaining tilt values for plural radial positions necessary (Step S6, Yes), the system controller 122 determines the approximate formula for the tilt value corresponding to the position of radius r of the optical disk medium by using the data for radius and tilt values stored in the RAM 128 (Step S7). For example, the coefficients a, b and the constant c for the following quadratic function are obtained.

$$f(r)=ar^2+br+c$$

In this procedure, since r1 and r2 stored in the RAM 128 are objective lens radii, they are to be used in a manner converted to tilt sensor radii. Numeral r0 requires no conversion since r0 is equal to the tilt sensor radius. The value used for r0 is 0.

FIG. 9 shall hereinafter be described. In an information recording/reproduction period, the system controller 122 obtains the present radial position r (=objective lens radius) from the digital servo circuit 132 (Step S11), and determines whether the radius is greater than a prescribed radius Th (Step S12) when the detected tilt value deviates from a prescribed range to thereby causing the window circuit 132 to generate a tilt error signal E. In this embodiment, estimation and correction of tilt detection error are performed for a peripheral area positioned more outward than the prescribed radius Th. The prescribed radius Th may be, for example, the aforementioned radius r0 at which the tilt sensor radius and the objective lens radius are equal.

If the radius r is no more than the prescribed radius Th, that is, if the present seek position is positioned more inward than the prescribed radius Th, the system controller 122 clears the offset register 134 (Step S18), and orders the tilt motor driver 133 to perform tilt compensation (Step S16). In this case, tilt compensation is performed according to the value of the tilt signal output from the tilt sensor circuit 131 (in other words performed according to the detected tilt value only) given that the value of the offset register 134 is 0. After completing the tilt compensation, the system controller 122 ceases tilt compensation of the tilt motor driver 133 (Step S17).

If the present radius r is greater than the prescribed radius Th, the system controller 122 calculates the present tilt sensor radius rs from the present radius r (Step S13). Then, by using the aforementioned approximate formula, tilt values f(r) and f(rs) corresponding to radius r and radius rs, respectively, are calculated where radius r0 is the criterion (Step S14). Then, the difference between the tilt values is obtained (f(r)−f(rs)) to thereby set the obtained difference as the offset value for the offset register 134 (Step S15). The foregoing procedure shall now be described with reference to FIG. 8. For example, in a case where r2 indicates the present radius r at which seek is performed (=objective lens radius) and r2s indicates tilt sensor radius rs, the difference between the obtained tilt values shall indicate tilt detection error, in which the difference ΔT is set as the offset value for the offset register 134.

After setting the offset value, the system controller 122 orders the tilt motor driver 133 to perform tilt compensation (Step S16). In this case, the tilt motor 11 is driven according to an added value obtained by adding the offset value, which is the estimated tilt detection error, to the detected tilt value. Accordingly, tilt can be compensated for with high precision. Although the tilt motor driver 133 includes a unit for adding the detected tilt value to the offset value (tilt detection error), the unit shall correspond to a tilt correction unit.

After the tilt compensation is completed, the system controller 122 ceases tilt compensation (Step S17).

Figure 12:
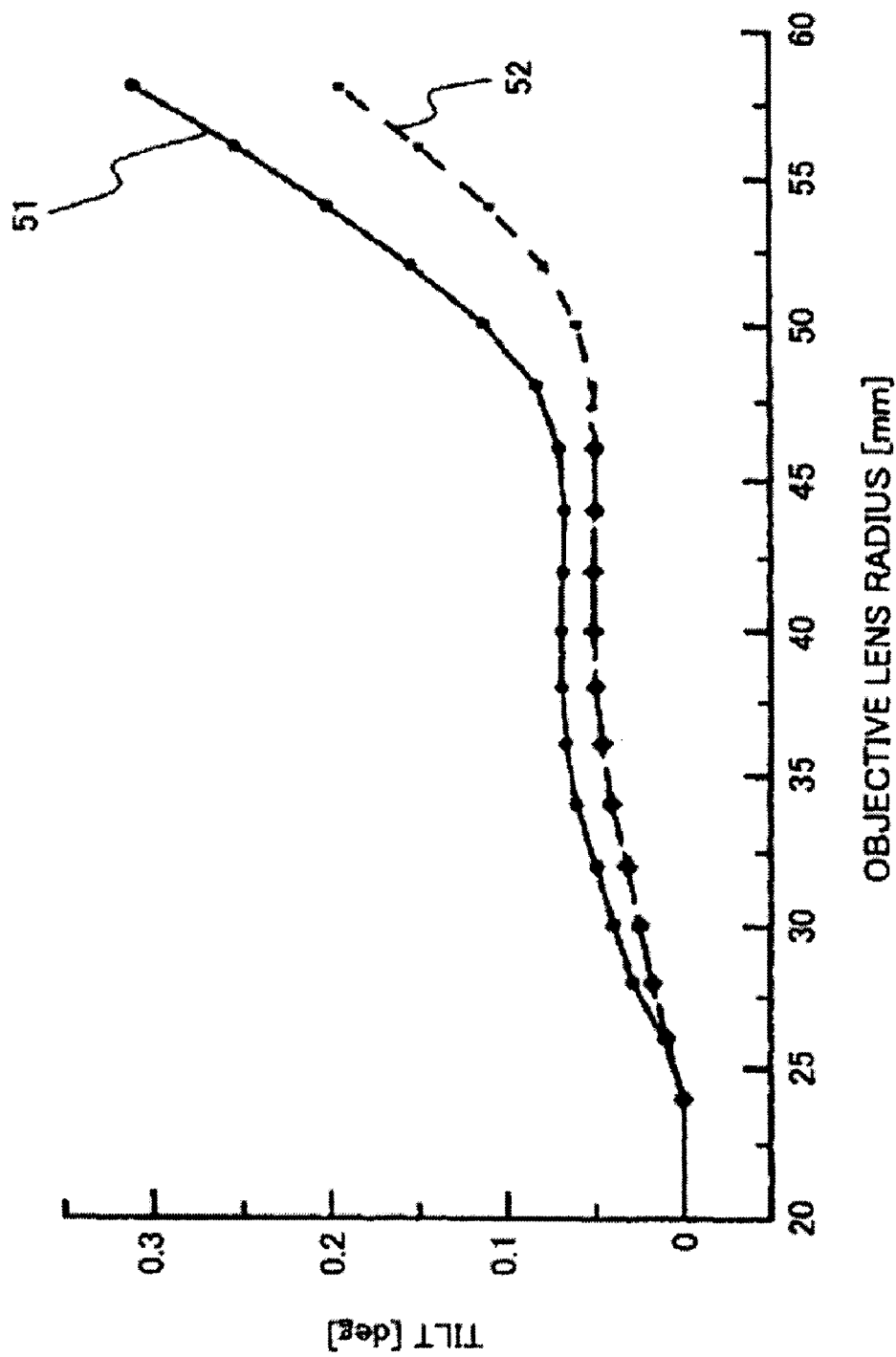
FIG. 12 is an exemplary graph showing a curved line indicating the tilt of a typical optical disk medium and a curved line indicating detected tilt.
Figure 13:
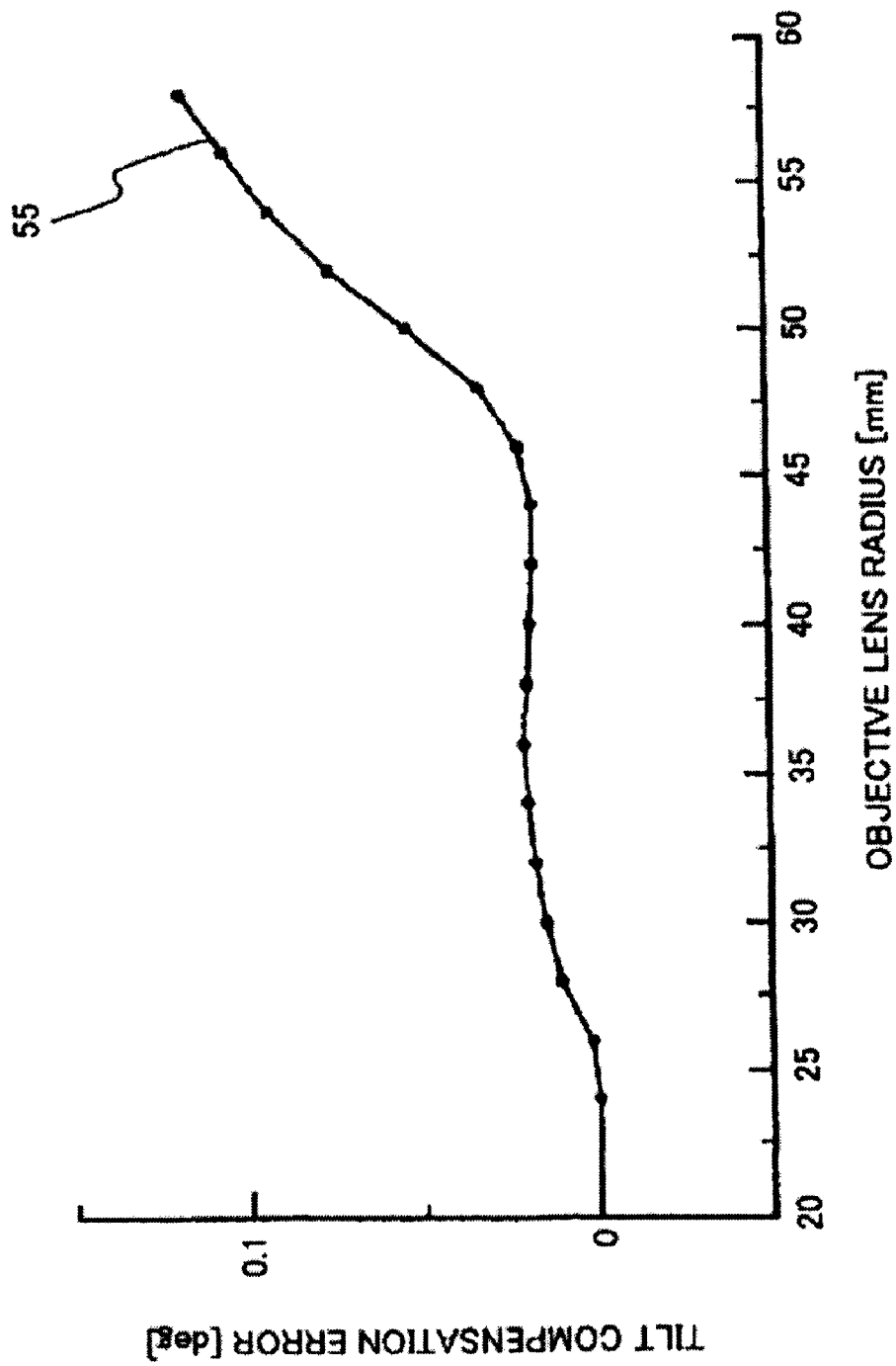
FIG. 13 is an exemplary graph showing a curved line indicating tilt compensation error before compensating for the tilt detection error.
Figure 16:
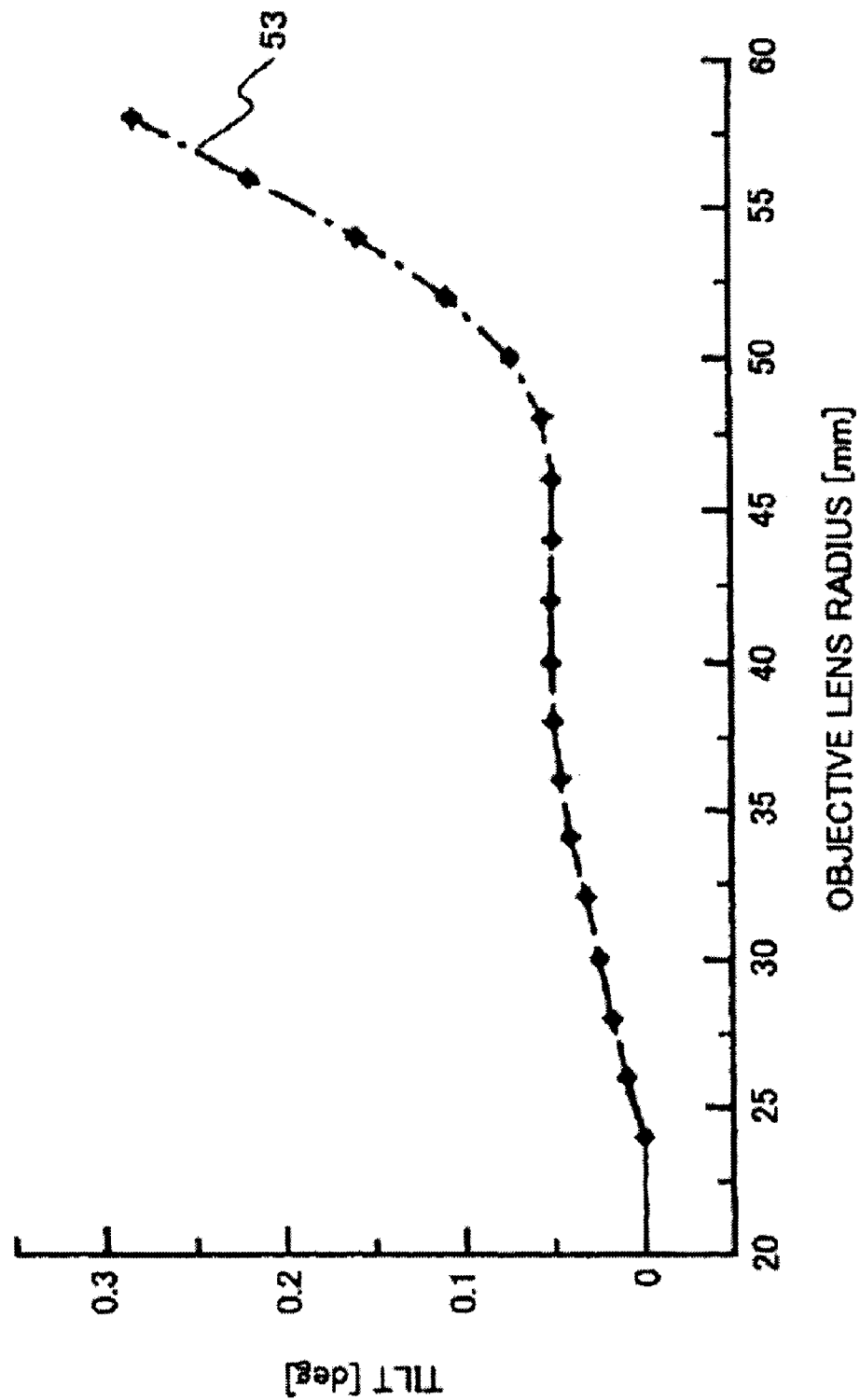
FIG. 16 is an exemplary graph showing a curved line indicating the tilt after compensating for the tilt detection error.
Figure 17:
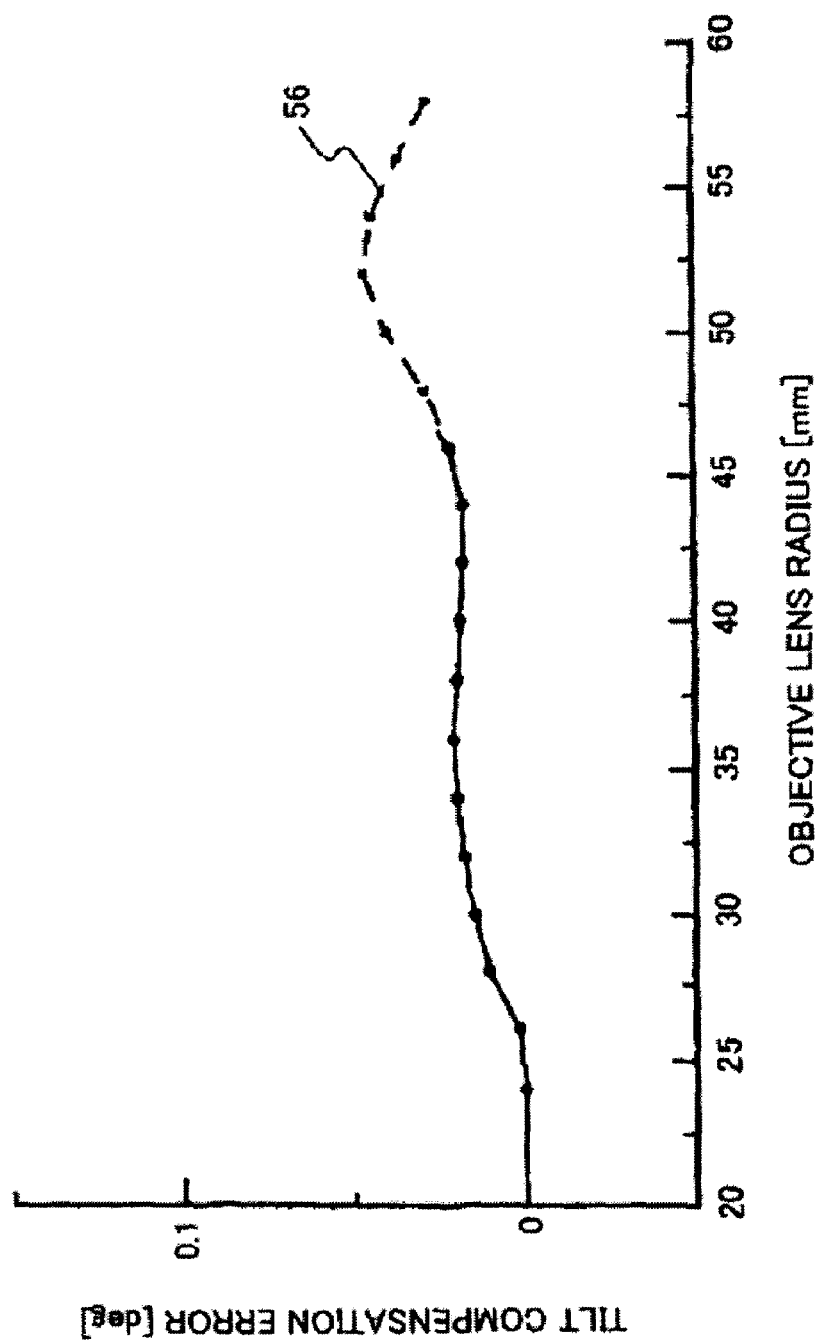
FIG. 17 is an exemplary graph showing a curved line indicating tilt compensation error after compensating for the tilt detection error.

The said correction of tilt detection error may, for example, be illustrated in a manner shown in FIG. 16, in which the tilt of an optical apparatus illustrated as curve 51 (FIG. 12) can be compensated for according to a corrected tilt value illustrated as curve 53. Accordingly, the tilt compensation error can be reduced significantly as illustrated as curve 56 in FIG. 17, and result in stable recording/reproduction even at the outer peripheral area of the optical disk medium.

As is apparent from the above description, step S7 in FIG. 7 and steps S13 through S15 enable estimation of tilt detection error for a radial position at which information is recorded/reproduced in accordance with tilt values priorly obtained from different radial positions. That is, this portion of the process shall correspond to a unit for estimating tilt detection error actuated by a program.

Figure 10:
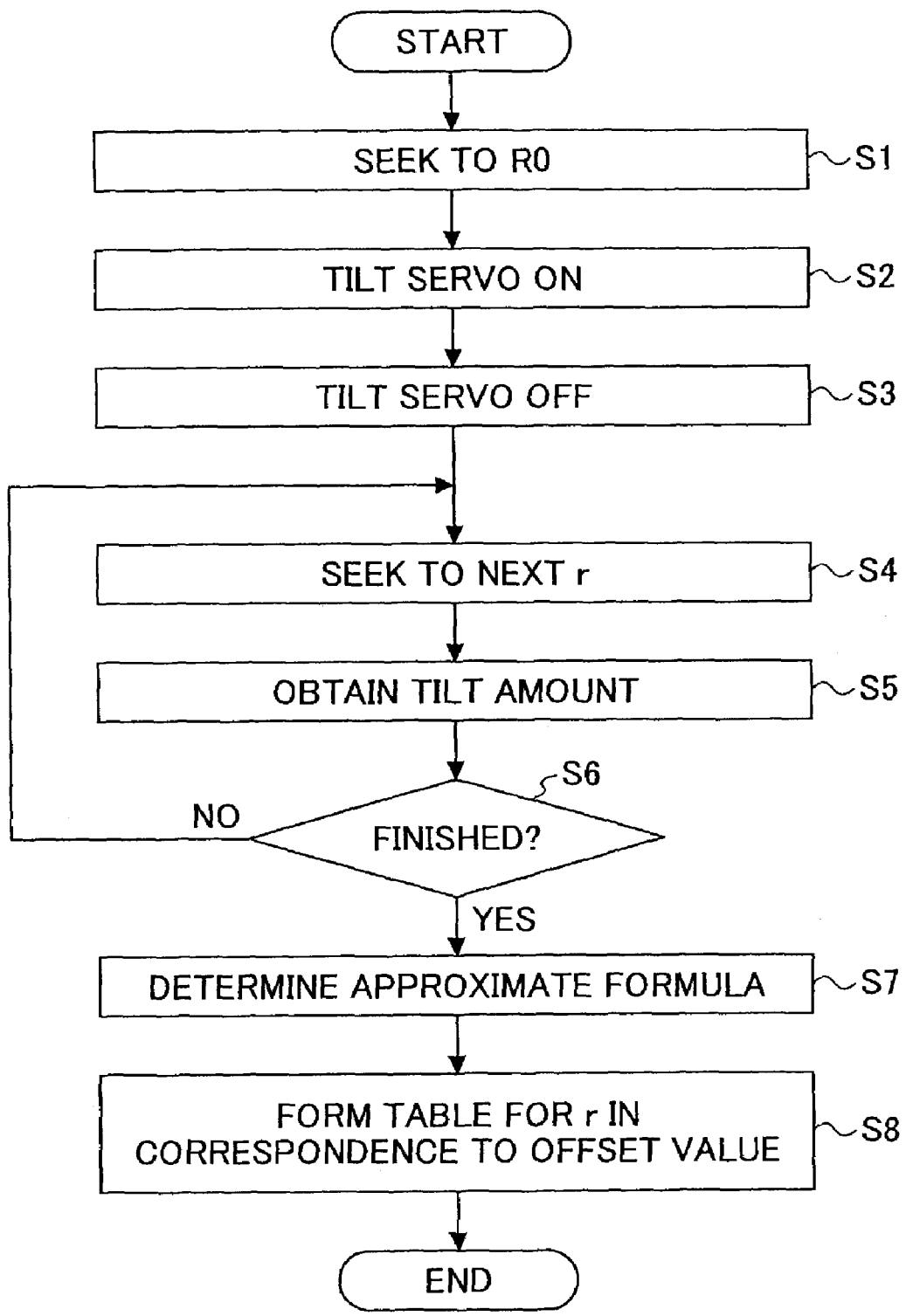
FIG. 10 is a flowchart for explaining controlling/processing performed during a mounting process of the second embodiment of the present invention.
Figure 11:
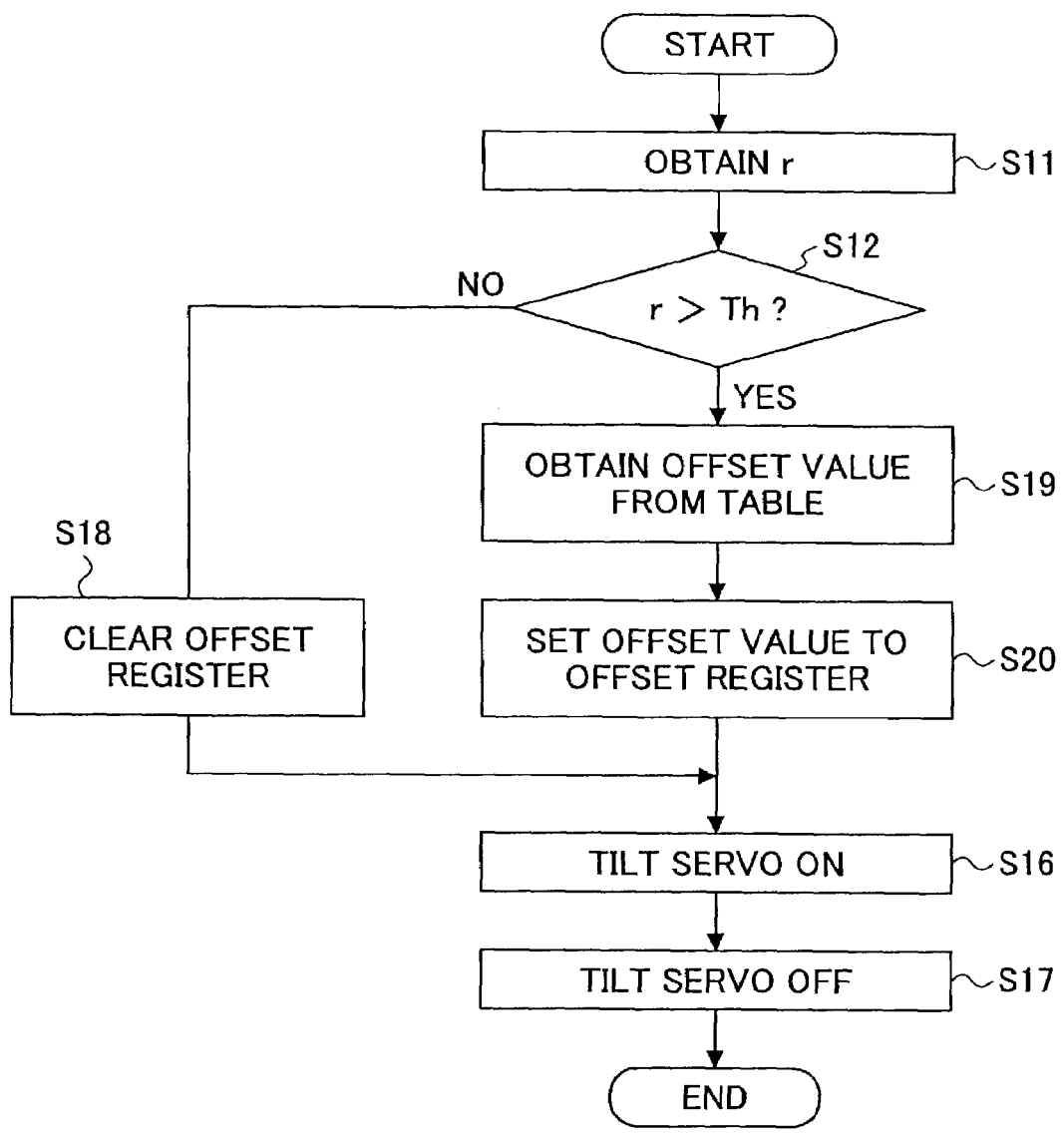
FIG. 11 is a flowchart for explaining controlling/processing performed during an information recording/reproduction period of the second embodiment of the present invention.

According to a second embodiment of the present invention, the process and control shown in FIG. 10 is performed during a mounting period, and the process and control shown in FIG. 11 is performed when a tilt error signal E is generated in a recording/reproduction period for recording/reproduction of information. Nevertheless, the process and control in FIG. 10 are not necessarily performed only during mounting. The process and control may also be performed when an optical disk medium inserted in the apparatus is subject to recording or reproduction for the first time.

FIG. 10 shall first be described. In FIG. 10, steps S1 through S7 are the same as the corresponding steps in FIG. 7, and step S8 is an added step. In step S8, the system controller 122 calculates estimated tilt values corresponding to radius (objective lens radius) and tilt sensor radius for each section in a range of a divided radius subject to tilt detection error correction by using an approximate formula, and then forms a table indicative of the difference of the radii (offset value) corresponding to the radius, and then, stores the table in the RAM 128.

Next, the second embodiment shall be described with reference to FIG. 11. The steps S19 and S20 in FIG. 11 are steps which replace steps S13 through S15 in FIG. 9. In step S19, the system controller 122 reads out the offset value corresponding to the present radius r from the table inside RAM 128. In step S20, the system controller 122 sets the offset value in the offset register 134. Descriptions other than the aforementioned procedures are the same as those in the first embodiment. That is, in the second embodiment, estimation of tilt detection error for each divided section of the radius is completed in the mounting period in steps S7 and S8 of FIG. 10, and the estimated value of tilt detection error corresponding to a radius section is used in the recording/reproduction period in steps S19 and S20 of FIG. 11. Accordingly, the processes S7 and S8 shall correspond to a unit for estimating tilt detection error actuated by a program.

The same as the first embodiment, this embodiment also corrects tilt detection error based on the difference between the objective lens radius and the tilt sensor radius, and reduces tilt compensation error considerably. Furthermore, this embodiment requires less processing workload since there is no need to perform calculation for estimating tilt detection error during recording/reproduction of information.

Meanwhile, an optical disk apparatus, in general, includes a unit for detecting the driving amount of a tilt mechanism (although not shown in FIG. 1). For example, in a case where a stepping motor is used as the tilt motor 11, a unit that counts the number of drive pulses and detects the rotation amount of the tilt motor 11 or the rotation angle of the cam 12 may be employed. Alternatively, a unit which measures the rotation amount of the tilt motor 11 or the rotation angle of the cam 12 according to the output of an optic or magnetic type rotary encoder or potentiometer, which operate relative to the rotation axis of the tilt motor, 11 may be employed. In the below given embodiments, the driving amount of a tilt mechanism detected by the aforementioned units are used for estimation of tilt detection error.

Figure 14:
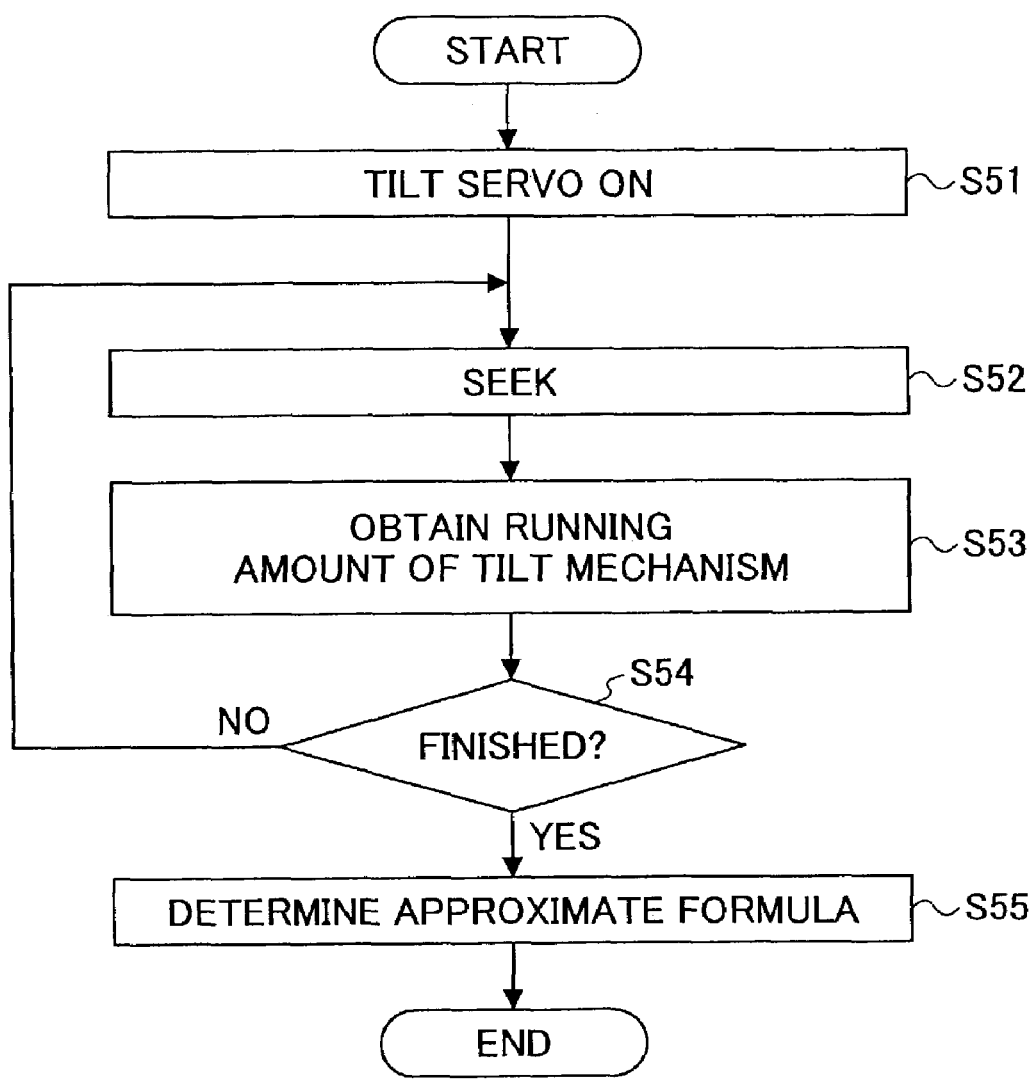
FIG. 14 is a flowchart for explaining a third embodiment of the present invention.

In a third embodiment, a process and control shown in FIG. 14 is performed when an optical disk medium inserted into the apparatus is subject to recording or reproduction for the first time. Nevertheless, the process and control in FIG. 10 may also be performed in a mounting period. Furthermore, process and control is performed in the same manner as the first embodiment where a tilt error signal E is generated in a recording/reproduction period.

The third embodiment shall be described with reference to FIG. 14. The system controller 122 orders the tilt motor driver 133 of the tilt servo circuit 130 to perform tilt compensation (Step S51). The tilt motor driver 133 receives a tilt signal output from the tilt sensor circuit 131, converts the tilt signal into a digital value (detected tilt value), and drives the tilt motor 11 according to an added value obtained by adding the digital value to a value of the offset register 134. Since the offset register during this step is cleared and the offset value is 0, tilt compensation during this step is performed according to the detected tilt value.

In this state where tilt compensation is performed, the system controller 122 orders the digital servo circuit to seek to a single predetermined radial position (Step S52). The digital servo circuit 114 signals the motor driver 116 to drive a seek motor of the optical pickup 100, to thereby move a pickup module 21 (Step S1) to the ordered radial position.

The system controller 122 obtains the driving amount of the tilt mechanism detected by the aforementioned units, and stores the obtained driving amount in the RAM 128 along with the radius corresponding to the seek position at that present time (objective lens radius) (Step S53). It is apparent that the driving amount of the tilt mechanism has a particular relation with the tilt amount of the optical disk medium. In other words, it is possible to convert the driving amount of the tilt mechanism into the amount of tilt. Nevertheless, the tilt amount converted from the driving amount shall be the tilt amount corresponding to the tilt sensor radius at that present time, since the driving amount is a result based on the tilt value detected at the tilt sensor radius, which slightly deviates from the radius of the seek position (objective lens radius).

Steps S52 and S53 are repeated, seek is performed at another predetermined radial position, and the driving amount of the tilt mechanism and radius are stored in the RAM 128. This procedure is performed repeatedly with respect to a number of predetermined radial positions. After completion of such a process (Step S54), step S55 shall follow.

In step S55, an approximate formula for a tilt value of a given radial position of the optical disk is determined in the same manner as step S7 in the first embodiment by using the tilt amount converted from the driving amount of the tilt mechanism stored in the RAM 128. However, since the radii stored in the RAM 128 are objective lens radiuses, they are to be used in a manner converted into tilt sensor radiuses.

It is apparent from the above description that the unit estimating tilt detection error in this embodiment uses the driving amount of the tilt mechanism previously obtained from a number of predetermined radial positions. The unit may be actuated by a program. The following fourth embodiment shall also be performed in the same manner.

In the fourth embodiment, since the process and control for tilt compensation in a recording/reproduction period for recording/reproduction of information are performed in a manner shown in FIG. 9, the corresponding description in the first embodiment shall be applied to this embodiment, and a description thereof shall not be repeated.

The same as the first and second embodiments, it is to be noted that estimation of tilt detection error and tilt correction may be performed only with respect to an outer peripheral position located more outward than a certain radial position of the optical disk medium. That is, this may also apply to the fourth embodiment.

Figure 15:
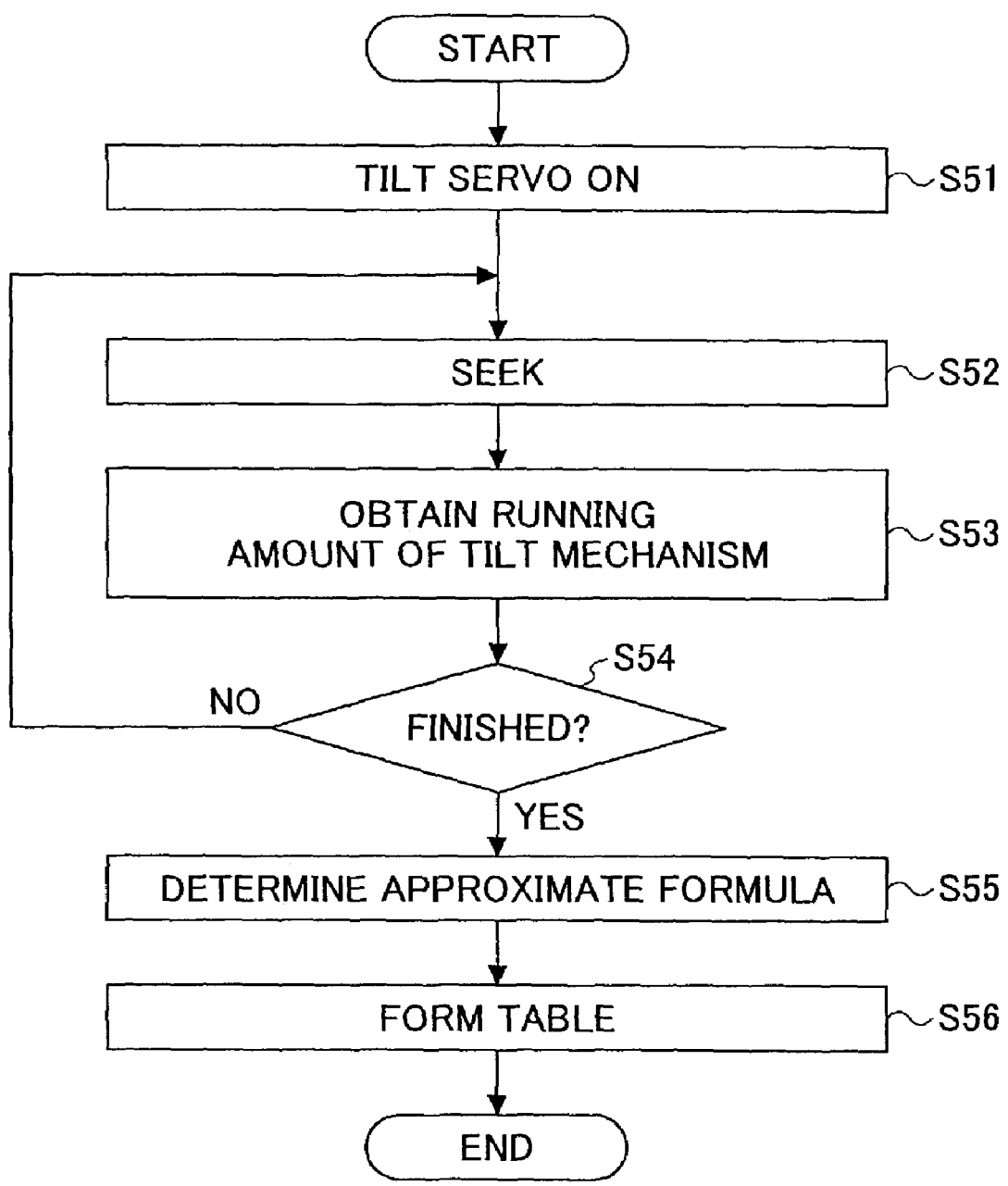
FIG. 15 is a flowchart for explaining a fourth embodiment of the present invention.

With the fourth embodiment of the present invention, a process and control shown in FIG. 15 is performed when an optical disk medium inserted in the apparatus is subject to recording or reproduction for the first time. Nevertheless, the process and control in FIG. 10 may also be performed in a mounting period. Furthermore, process and control performed in the subsequent recording/reproduction period is performed in the same manner as those shown in FIG. 11 of the second embodiment.

FIG. 15 shall first be described. In FIG. 15, steps S51 through S55 are the same as the corresponding steps in FIG. 14, and step S56 is an added step. In step S56, the system controller 122, in the same manner as step S8 of the second embodiment, calculates estimated tilt values corresponding to radius (objective lens radius) and tilt sensor radius for each section in a range of a divided radius subject to tilt detection error correction by using an approximate formula, and then forms a table indicative of the difference of the radii (offset value) corresponding to radius, and then, stores the table into the RAM 128.

Since the process and control for tilt compensation in a recording/reproduction period for recording/reproduction of information are performed in a manner shown in FIG. 11, the corresponding description in the second embodiment shall be applied to this embodiment, and a description thereof shall not be repeated.

Although the unit for estimating tilt detection error is actuated as a program in the aforementioned embodiments, it is to be noted that a hardware unit may also be used for actuating estimation of tilt detection error, and such embodiment may also be included in the present invention. Part of the processes described with reference to FIGS. 7, 9, 10, 11, 14, and 15 may be performed by an upper level apparatus such as a personal computer connected to an optical disk apparatus. For example, calculation for steps S7, S8, S55, S56, S13, and S14 may be performed with an upper level apparatus. Such embodiment may also be included in the present invention. It is apparent that the present invention may also be applied to an optical disk apparatus which only records or reproduces information on an optical disk medium. It is also apparent that the optical disk medium is not to be restricted to a particular kind. In the estimation for tilt detection error, a method such as a polynomial approximation may also be used. The present invention may also be applied to an optical disk apparatus that performs tilt compensation not by adjusting the angle of the pickup module, but by adjusting the direction of the objective lens.

Since the above described present invention is able to reduce tilt compensation error by correcting tilt detection error caused by the difference between the objective lens radius and the tilt sensor radius, an optical disk apparatus having a tilt compensation function shall be able to record/reproduce stably even for an optical disk medium that bends considerably. Furthermore, unlike the conventional art, the present invention shall not excessively increase the waiting time before beginning a recording/reproduction operation of information since the tilt value or driving amount of the tilt mechanism, which is required beforehand for estimating tilt detection error, must be obtained only from a number of radial positions. Other than compensating tilt detection error and ensuring stable tilt compensation with respect to the outer peripheral side of the optical disk medium at which tilt detection error generally tends to increase, the present invention is also able to reduce the processing workload for estimating tilt detection error and correcting tilt value with respect to the inner peripheral portion of the optical disk medium. Since tilt compensation of high precision may be achieved at the radial position where the objective lens radius and the tilt sensor radius are equal even in a state where the tilt detection error is not yet known, the present invention is able to obtain a precise tilt value by having that radial position as a criterion, and is also able to precisely determine the approximate formula for tilt by a simple process from the obtained tilt values.

Further, the present invention is not limited to these embodiments, but various variations and modifications may be made without departing from the scope of the present invention.

The present application is based on Japanese priority applications Nos. 2002-153401, and 2002-255149 filed on May 28, 2002, and Aug. 30, 2002, respectively, with the Japanese Patent Office, the entire contents of which are hereby incorporated by reference.

What is claimed is:

1. An optical disk apparatus, comprising:
   a tilt detection unit detecting a tilt value of an optical disk medium with respect to an optical system, the optical system comprising a sub-chassis and a main chassis;
   a tilt compensation unit compensating for the tilt of the optical disk medium by pressing an end portion of the sub-chassis against a cam that changes height, thereby adjusting a relative angle between the optical system and the optical disk medium according to the tilt value detected by the tilt detection unit; and
   a tilt detection error estimation unit estimating tilt detection error of the tilt detection unit with respect to a radial position of the optical disk medium at which information is recorded/reproduced by the optical system by referring to tilt values that are previously detected at a plurality of radial positions of the optical disk medium by the tilt detection unit, the tilt detection error being the difference between a tilt sensor radius and an objective lens radius,
   wherein the tilt compensation unit has a correction unit that corrects the tilt value according to the tilt detection error estimated by the tilt detection error estimation unit, and the tilt compensation unit compensates for the tilt of the optical disk medium according to the tilt value corrected by the correction unit.

2. The optical disk apparatus as claimed in claim 1, wherein the estimation of tilt detection error and the correction of tilt value are performed on the optical disk medium only with respect to a portion thereof that is disposed more outward than a prescribed radial position of the optical disk medium.

3. An optical disk apparatus, comprising:
   a tilt detection unit detecting a tilt value of an optical disk medium with respect to an optical system, the optical system comprising a sub-chassis and a main chassis;
   a tilt compensation unit compensating for the tilt of the optical disk medium by signaling a tilt mechanism to adjust a relative angle between the optical system and the optical disk medium according to the tilt value detected by the tilt detection unit, wherein the tilt mechanism adjusts the relative angle by pressing an end portion of the sub-chassis against a cam that changes height; and
   a tilt detection error estimation unit estimating tilt detection error of the tilt detection unit with respect to a radial position of the optical disk medium at which information is recorded/reproduced by the optical system by referring to driving amounts of the tilt mechanism that are previously detected at plural radial positions of the optical disk medium, the tilt detection error being the difference between a tilt sensor radius and an objective lens radius,
   wherein the tilt compensation unit has a correction unit that corrects the tilt value according to the tilt detection error estimated by the tilt detection error estimation unit, and the tilt compensation unit compensates for the tilt of the optical disk medium according to the tilt value corrected by the correction unit.

4. The optical disk apparatus as claimed in claim 3, wherein the estimation of tilt detection error and the correction of tilt value are performed on the optical disk medium only with respect to a portion thereof that is disposed more outward than a prescribed radial position of the optical disk medium.

5. A method of compensating for the tilt of an optical disk medium, comprising the steps of:
   a) detecting tilt values from a plurality of radial positions of the optical disk medium in a state where tilt compensation is ceased;
   b) estimating tilt detection error at a radial position of the optical disk medium according to the tilt values obtained in step a), and forming a table indicative of radial positions corresponding to tilt detection errors, the tilt detection error being the difference between a tilt sensor radius and an objective lens radius
   c) obtaining the tilt detection error at a radial position of the optical disk medium at which information is recorded/reproduced by the optical system by using the table; and
   d) conducting tilt compensation according to a tilt value corrected to the extent of the tilt detection error obtained in step c) by pressing an end portion of a sub-chassis of an optical system against a cam that changes height, thereby changing an angle of the optical disk medium in relation to the optical system.

6. The method of compensating for the tilt of an optical disk medium as claimed in claim 5, further comprising a step of compensating for a tilt at a predetermined radial position at which a distance from the center of the optical disk medium to a position at which information is recorded/reproduced by the optical system is equal to a distance from the center of the optical disk medium to a position where tilt is detected, wherein the tilt compensation is conducted prior to step a).

7. A method of compensating for the tilt of an optical disk medium, comprising the steps of:
 a) detecting tilt values from a plurality of radial positions of the optical disk medium in a state where tilt compensation is ceased;
 b) determining an approximate formula based on radial positions of the optical disk medium according to the tilt values detected in step a);
 c) determining a tilt detection error by calculating the tilt value of a radial position at which information is recorded/reproduced by the optical system and another tilt value at which the present tilt is detected by using the approximate formula, and obtaining the difference between the two tilt values; and
 d) conducting tilt compensation according to the tilt value corrected to the extent of the tilt detection error obtained in step c) by pressing an end portion of a sub-chassis of an optical system against a cam that changes height, thereby changing an angle of the optical disk medium in relation to the optical system.

8. The method of compensating for the tilt of an optical disk as claimed in claim 7, further comprising a step of compensating for tilt at a predetermined radial position at which a distance from the center of the optical disk medium to a position at which information is recorded/reproduced by the optical system is equal to a distance from the center of the optical disk medium to a position where tilt is detected, wherein the tilt compensation is conducted prior to step a).

9. A method of compensating for the tilt of an optical disk medium, comprising the steps of:
 a) detecting the driving amount of a tilt mechanism from a plurality of radial positions of the optical disk medium in a state where tilt compensation is performed;
 b) estimating tilt detection error at a radial position of the optical disk medium according to the driving amount obtained in step a), and forming a table indicative of radial positions corresponding to tilt detection errors, the tilt detection error being the difference between a tilt sensor radius and an objective lens radius;
 c) obtaining the tilt detection error at a radial position of the optical disk medium at which information is recorded/reproduced by an optical system by using the table; and
 d) conducting tilt compensation according to a tilt value corrected to the extent of the tilt detection error obtained in step c) by pressing an end portion of a sub-chassis of an optical system against a cam that changes height, thereby changing an angle of the optical disk medium in relation to the optical system.

10. A method of compensating for the tilt of an optical disk medium, comprising the steps of:
 a) detecting the driving amount of a tilt mechanism from a plurality of radial positions of the optical disk medium in a state where tilt compensation is performed;
 b) determining an approximate formula based on radial positions of the optical disk medium according to the driving amount obtained in step a);
 c) determining a tilt detection error by calculating the tilt value of a radial position at which information is recorded/reproduced by the optical system and another tilt value at which the present tilt is detected by using the approximate formula, and obtaining the difference between the two tilt values; and
 d) conducting tilt compensation according to a tilt value corrected to the extent of the tilt detection error obtained in step c) by pressing an end portion of a sub-chassis of an optical system against a cam that changes height, thereby changing an angle of the optical disk medium in relation to the optical system.

11. A program using a processor for compensating for the tilt of an optical disk medium, comprising the steps of:
 a) detecting tilt values from a plurality of radial positions of the optical disk medium in a state where tilt compensation is ceased;
 b) estimating tilt detection error at a radial position of the optical disk medium according to the tilt values obtained in step a), and forming a table indicative of radial positions corresponding to tilt detection errors, the tilt detection error being the difference between a tilt sensor radius and an objective lens radius;
 c) obtaining the tilt detection error at a radial position of the optical disk medium at which information is recorded/reproduced by the optical system by using the table; and
 d) conducting tilt compensation according to a tilt value corrected to the extent of the tilt detection error obtained in step c) by pressing an end portion of a sub-chassis of an optical system against a cam that changes height, thereby changing an angle of the optical disk medium in relation to the optical system.

12. The program using a processor for compensating for the tilt of an optical disk medium as claimed in claim 11, further comprising a step of compensating for tilt at a predetermined radial position at which a distance from the center of the optical disk medium to a position at which information is recorded/reproduced by the optical system is equal to a distance from the center of the optical disk medium to a position where tilt is detected, wherein the tilt compensation is conducted prior to step a).

13. A program using a processor for compensating for the tilt of an optical disk medium, comprising the steps of:
 a) detecting tilt values from a plurality of radial positions of the optical disk medium in a state where tilt compensation is ceased;
 b) determining an approximate formula based on radial positions of the optical disk medium according to the tilt values detected in step a);
 c) determining a tilt detection error by calculating the tilt value of a radial position at which information is recorded/reproduced by the optical system and another tilt value at which the present tilt is detected by using the approximate formula, and obtaining the difference between the two tilt values; and
 d) conducting tilt compensation according to a tilt value corrected to the extent of the tilt detection error obtained in step c) by pressing an end portion of a sub-chassis of an optical system against a cam that changes height, thereby changing an angle of the optical disk medium in relation to the optical system.

14. The program using a processor for compensating for the tilt of an optical disk medium as claimed in claim 13, further comprising a step of compensating for tilt at a predetermined radial position at which a distance from the center of the optical disk medium to a position at which information is recorded/reproduced by the optical system is equal to a distance from the center of the optical disk medium to a position where tilt is detected, wherein the tilt compensation is conducted prior to step a).

15. A program using a processor for compensating for the tilt of an optical disk medium, comprising the steps of:
   a) detecting the driving amount of a tilt mechanism from a plurality of radial positions of the optical disk medium in a state where tilt compensation is performed;
   b) estimating tilt detection error at a radial position of the optical disk medium according to the driving amount obtained in step a), and forming a table indicative of radial positions corresponding to tilt detection errors, the tilt detection error being the difference between a tilt sensor radius and an objective lens radius
   c) obtaining the tilt detection error at a radial position of the optical disk medium at which information is recorded/reproduced by an optical system by using the table; and
   d) conducting tilt compensation according to a tilt value corrected to the extent of the tilt detection error obtained in step c) by pressing an end portion of a sub-chassis of an optical system against a cam that changes height, thereby changing an angle of the optical disk medium in relation to the optical system.

16. A program using a processor for compensating for the tilt of an optical disk medium, comprising the steps of:
   a) detecting the driving amount of tilt mechanism from a plurality of radial positions of the optical disk medium in a state where tilt compensation is performed;
   b) determining an approximate formula at a radial position of the optical disk medium according to the driving amount obtained in step a);
   c) determining a tilt detection error by calculating the tilt value of a radial position at which information is recorded/reproduced by an optical system and another tilt value at which the present tilt is detected by using the approximate formula, and obtaining the difference between the two tilt values; and
   d) conducting tilt compensation according to a tilt value corrected to the extent of the tilt detection error obtained in step c) by pressing an end portion of a sub-chassis of an optical system against a cam that changes height, thereby changing an angle of the optical disk medium in relation to the optical system.

17. An information recording medium having a program recorded thereto for enabling a processor to perform a method of compensating for the tilt of an optical disk medium, the method comprising the steps of:
   a) detecting tilt values from a plurality of radial positions of the optical disk medium in a state where tilt compensation is ceased;
   b) estimating tilt detection error at a radial position of the optical disk medium according to the tilt values obtained in step a), and forming a table indicative of radial positions corresponding to tilt detection errors, the tilt detection error being the difference between a tilt sensor radius and an objective lens radius
   c) obtaining the tilt detection error at a radial position of the optical disk medium at which information is recorded/reproduced by the optical system by using the table; and
   d) conducting tilt compensation according to a tilt value corrected to the extent of the tilt detection error obtained in step c) by pressing an end portion of a sub-chassis of an optical system against a cam that changes height, thereby changing an angle of the optical disk medium in relation to the optical system.

18. The information recording medium having a program recorded thereto for enabling a processor to perform a method of compensating for the tilt of an optical disk medium as claimed in claim 17, wherein the method further comprises a step of compensating for tilt at a predetermined radial position at which a distance from the center of the optical disk medium to a position at which information is recorded/reproduced by the optical system is equal to a distance from the center of the optical disk medium to a position where tilt is detected, wherein the tilt compensation is conducted prior to step a).

19. An information recording medium having a program recorded thereto for enabling a processor to perform a method of compensating for the tilt of an optical disk medium, the method comprising the steps of:
   a) detecting tilt values from a plurality of radial positions of the optical disk medium in a state where tilt compensation is ceased;
   b) determining an approximate formula based on radial positions of the optical disk medium according to the tilt values detected in step a);
   c) determining a tilt detection error by calculating the tilt value of a radial position at which information is recorded/reproduced by the optical system and another tilt value at which the present tilt is detected by using the approximate formula, and obtaining the difference between the two tilt values; and
   d) conducting tilt compensation according to a tilt value corrected to the extent of the tilt detection error obtained in step c) by pressing an end portion of a sub-chassis of an optical system against a cam that changes height, thereby changing an angle of the optical disk medium in relation to the optical system.

20. The information recording medium having a program recorded thereto for enabling a processor to perform a method of compensating for the tilt of an optical disk medium as claimed in claim 19, further comprising a step of compensating for tilt at a predetermined radial position at which a distance from the center of the optical disk medium to a position at which information is recorded/reproduced by the optical system is equal to a distance from the center of the optical disk medium to a position where tilt is detected, wherein the tilt compensation is conducted prior to step a).

21. An information recording medium having a program recorded thereto for enabling a processor to perform a method of compensating for the tilt of an optical disk medium, the method comprising the steps of:
   a) detecting the driving amount of a tilt mechanism from a plurality of radial positions of the optical disk medium in a state where tilt compensation is performed;
   b) estimating tilt detection error at a radial position of the optical disk medium according to the driving amount obtained in step a), and forming a table indicative of radial positions corresponding to tilt detection errors, the tilt detection error being the difference between a tilt sensor radius and an objective lens radius c) obtaining the tilt detection error at a radial position of the optical disk medium at which information is recorded/reproduced by an optical system by using the table; and d) conducting tilt compensation according to a tilt value corrected to the extent of the tilt detection error obtained in step c) by pressing an end portion of a sub-chassis of an optical system against a cam that changes height, thereby changing an angle of the optical disk medium in relation to the optical system.

22. An information recording medium having a program recorded thereto for enabling a processor to perform a method of compensating for the tilt of an optical disk medium, the method comprising the steps of:

a) detecting the driving amount of tilt mechanism from a plurality of radial positions of the optical disk medium in a state where tilt compensation is performed;

b) determining an approximate formula based on radial positions of the optical disk medium according to the driving amount obtained in step a);

c) determining a tilt detection error by calculating the tilt value of a radial position at which information is recorded/reproduced by an optical system and another tilt value at which the present tilt is detected by using the approximate formula, and obtaining the difference between the two tilt values; and d) conducting tilt compensation according to a tilt value corrected to the extent of the tilt detection error obtained in step c) by pressing an end portion of a sub-chassis of an optical system against a cam that changes height, thereby changing an angle of the optical disk medium in relation to the optical system.

* * * * *